United States Patent [19]
Shimada

[11] Patent Number: 5,737,502
[45] Date of Patent: Apr. 7, 1998

[54] CHARACTER PROCESSING APPARATUS HAVING A CURSOR WHOSE DISPLAY FORM CHANGES WITH PITCH

[75] Inventor: Naoki Shimada, Tokyo, Japan

[73] Assignee: Canon Kabushiki Kaisha, Tokyo, Japan

[21] Appl. No.: 387,620

[22] Filed: Feb. 13, 1995

Related U.S. Application Data

[63] Continuation of Ser. No. 109,458, Aug. 20, 1993, abandoned, which is a continuation of Ser. No. 821,904, Jan. 15, 1992, abandoned, which is a continuation of Ser. No. 666,561, Mar. 8, 1991, abandoned, which is a continuation of Ser. No. 194,149, May 16, 1988, abandoned.

[30] Foreign Application Priority Data

May 22, 1987 [JP] Japan ................................. 62-124000

[51] Int. Cl.$^6$ ........................... G06F 3/12; G06F 3/14; G06T 11/60
[52] U.S. Cl. ......................... 395/110; 395/793; 395/801; 395/805; 400/76; 400/84; 345/143
[58] Field of Search ................................... 395/110, 115, 395/116, 146, 150, 793, 801, 791, 805, 167, 172; 400/70, 76, 83–84, 61–63; 345/128, 141, 143, 192, 194–195, 25–26

[56] References Cited

U.S. PATENT DOCUMENTS

| | | | |
|---|---|---|---|
| 4,176,974 | 12/1979 | Bishai et al. | 400/111 |
| 4,447,888 | 5/1984 | Kuecker et al. | 395/791 |
| 4,580,916 | 4/1986 | Rolfo et al. | 400/109 |
| 4,768,164 | 8/1988 | Dreher | 400/70 X |
| 4,772,142 | 9/1988 | Makita | 400/144.2 |
| 4,864,518 | 9/1989 | Kurita | 345/141 |
| 4,907,193 | 3/1990 | Masaki | 400/61 X |
| 5,008,809 | 4/1991 | Matsaki | 345/194 |
| 5,452,404 | 9/1995 | Matsuzaki et al. | 395/112 |

FOREIGN PATENT DOCUMENTS

| | | |
|---|---|---|
| 129005 | 12/1984 | European Pat. Off. . |
| 221747 | 5/1987 | European Pat. Off. . |
| 55278 | 4/1983 | Japan . |

OTHER PUBLICATIONS

IBM Technical Disclosure Bulletin, vol. 27, No. 11, Apr. 1985, p. 6510, "Variable–Width Ghost Cursor for Multiple Font Characters".

IBM Technical Disclosure Bulletin, vol. 15, No. 10, Mar. 1973, pp. 3130–3131, J. L. Bennett, "Explicit Display of Multiply–Mapped Characters".

*Primary Examiner*—Raymond J. Bayerl
*Attorney, Agent, or Firm*—Fitzpatrick, Cella, Harper & Scinto

[57] ABSTRACT

A character processing apparatus for arbitrarily setting a character pitch when a mathematical formula is input. This apparatus includes: a memory to store character patterns corresponding to character pitches; a keyboard to input character information to read out the character pattern to be displayed from the memory; a display device to display at least the character patterns; a designating device to designate the character pitch of the character pattern to be displayed; a cursor display device for changing the display form of the cursor to designate the display position to display the character pattern in correspondence to the character pitch designated by the designating device, and for displaying the changed display form; and a display controller which, when the character information is input by the keyboard, reads out the character pattern corresponding to the character information from the memory at the display position of the cursor displayed by the cursor display device on the basis of the character pitch corresponding to the cursor display form. With this apparatus, the character pitch and line interval are adjusted. When a mathematical formula is input, the character string constituting this formula can be displayed and printed with a good balance.

16 Claims, 24 Drawing Sheets

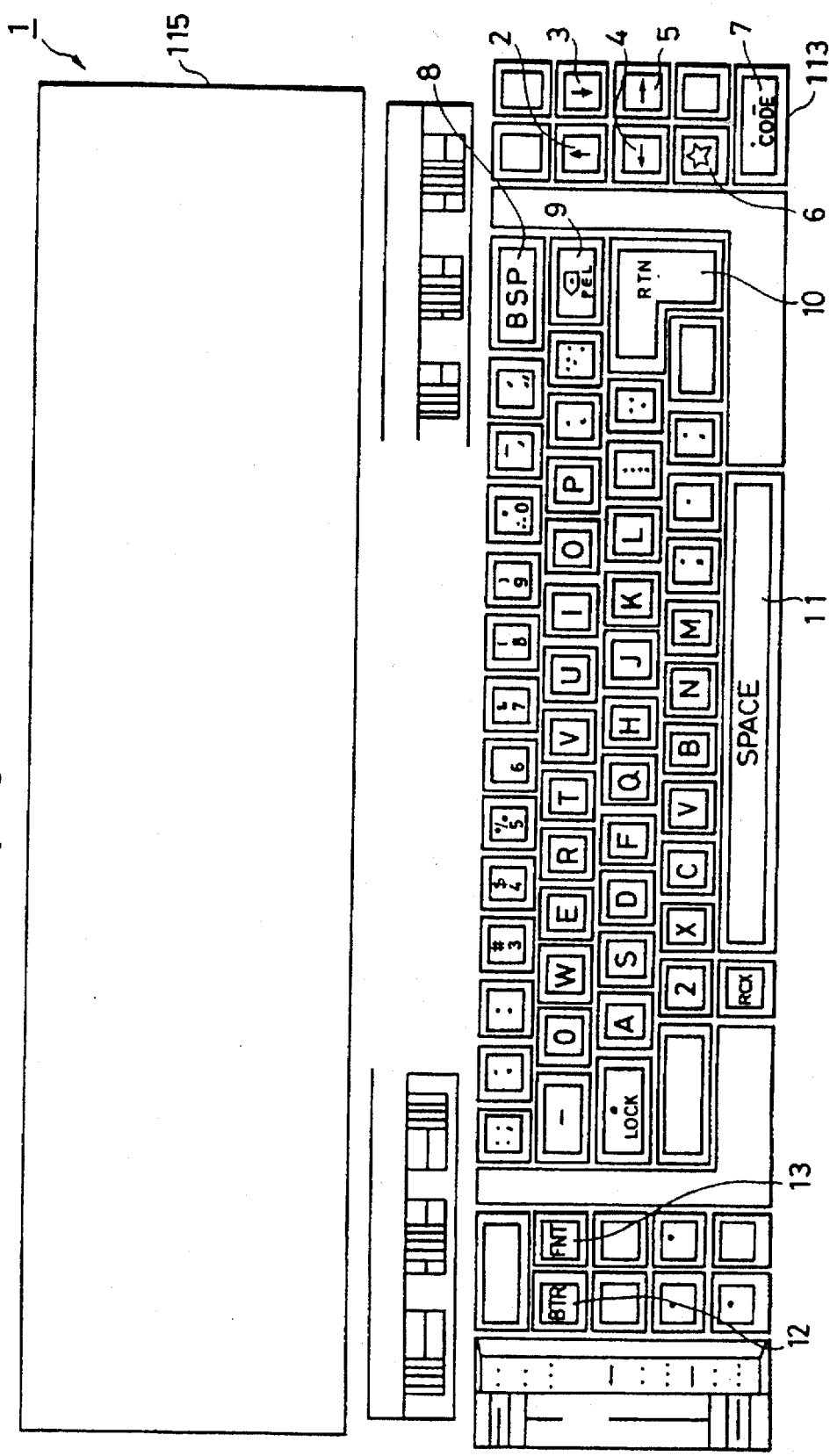

FIG. 7
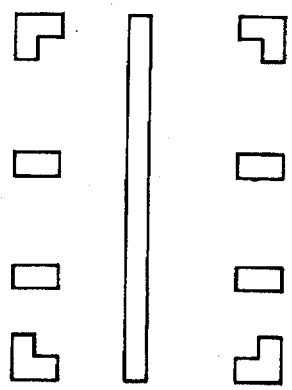
FIG. 8A
FIG. 8B
FIG. 8C
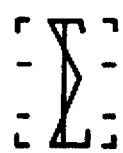
FIG. 8D
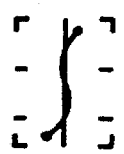
FIG. 8E
FIG. 8F
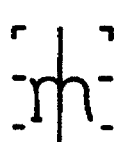
FIG. 8G
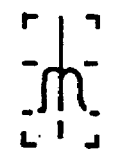
FIG. 8H
FIG. 8I
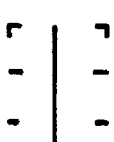
FIG. 9
$$\int \operatorname{cosec}^2 ax\, dx = \int \frac{dx}{\sin^2 ax} = \frac{1}{a} \tan ax$$

FIG. 23A  FIG. 23B  FIG. 23C
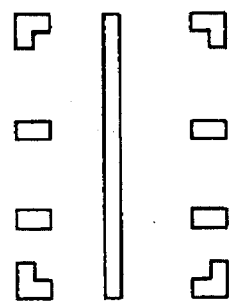 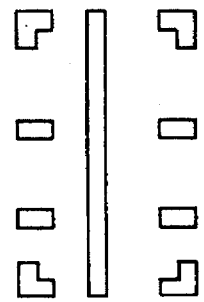 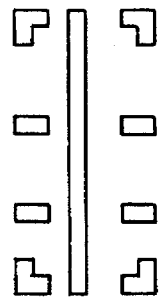
FIG. 24A  FIG. 24B  FIG. 24C
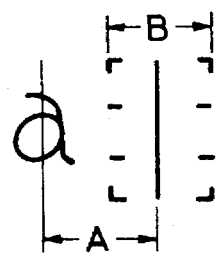 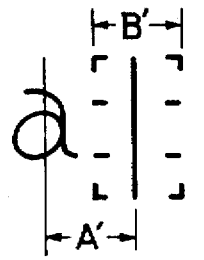 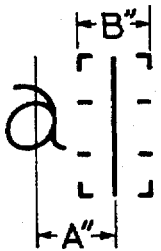
FIG. 25A  FIG. 25B
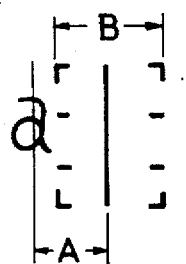 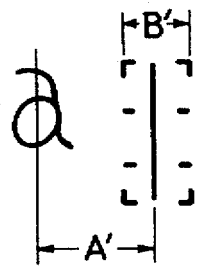
FIG. 26A  FIG. 26B
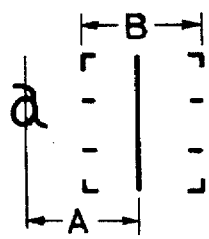 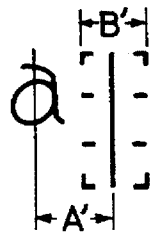

FIG. 28
| PITCH (BEFORE) \ PITCH (AFTER) | 10 | 12 | 15 | SYMBOL (10) |
|---|---|---|---|---|
| 10 | 0 | 82H | 84H | 0 |
| 12 | 2H | 0 | 82H | 4H |
| 15 | 4H | 2H | 0 | 4H |
| SYMBOL (10) | 0 | 82H | 84H | 0 |
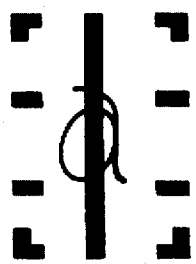
FIG. 29A
FIG. 29B

CHARACTER PROCESSING APPARATUS HAVING A CURSOR WHOSE DISPLAY FORM CHANGES WITH PITCH

This application is a continuation of application Ser. No. 08/109,458, filed Aug. 20, 1993, now abandoned, which is a continuation of application Ser. No. 07/821,904 filed Jan. 15, 1992, now abandoned, which is a continuation of application Ser. No. 07/666,561 filed Mar. 8, 1991, now abandoned, which is a continuation of application Ser. No. 07/194,149 filed May 16, 1988, now abandoned.

BACKGROUND OF THE INVENTION

1. Field of the Invention

The present invention relates to a character processing apparatus and, more particularly, to a character processing apparatus for arbitrarily setting a character pitch, for example, in the case of inputting mathematical formulas.

2. Related Background Art

Hitherto, in character processing apparatuses such as electronic typewriters, word processors, etc., when characters are input, for example, in the case of performing the recording, display, and the like of the input characters in the height direction on a line unit basis, there is no difference between an ordinary document and a mathematical formula with respect to the character processes.

On the other hand, if an operator wants to point or display mathematical fomulas when characters are processed, even in a document, mathematical fomulas can be freely printed or displayed by using characters such as symbols and letters. However, no consideration is made with regard to the balance of the characters in the mathematical formulas when they are recorded or displayed.

Therefore, in such apparatuses, the resultant mathematical formulas are formed by merely placing characters in lines and there is a sense of incompatibility when they are read. As mentioned above, in the character processes for mathematical formulas or the like, there is the problem editing of the mathematical formulas results in the occurrence of unbalanced characters displayed on the display screen and printed on recording paper.

SUMMARY OF THE INVENTION

The present invention is made in consideration of the foregoing conventional apparatuses and it is an object of the invention to provide a character processing apparatus in which character pitches and line intervals are adjusted and, in particular, a character string constituting a mathematical formula can be arranged with a good balance.

BRIEF DESCRIPTION OF THE DRAWINGS

FIG. 3 is a schematic diagram for explaining a keyboard section and its periphery devices;

FIGS. 4A and 4B are diagrams showing the relation between the operation of a wheel magazine and the printing of a wheel motor and the like;

FIGS. 7, 8A to 8I, 9, 10A, 10B, 11, 12, 13, 14, 15A, 15B, 16, 17A, 17B, 19, 22, 23A, 23B, 23C, 24A, 24B, 24C, 25A, 25B, 26A, 26B, 28, 29A, and 29B are diagrams for explaining the display and printing of characters according to the embodiment.

DETAILED DESCRIPTION OF THE EMBODIMENT

An embodiment of the present invention will be described in detail hereinbelow with reference to the drawings.

In this embodiment, an electronic typewriter suitable for embodying the invention is used as a character processing apparatus. However, the invention is not limited to this example.

(External view and constitution of the embodiment)

Figure 1:
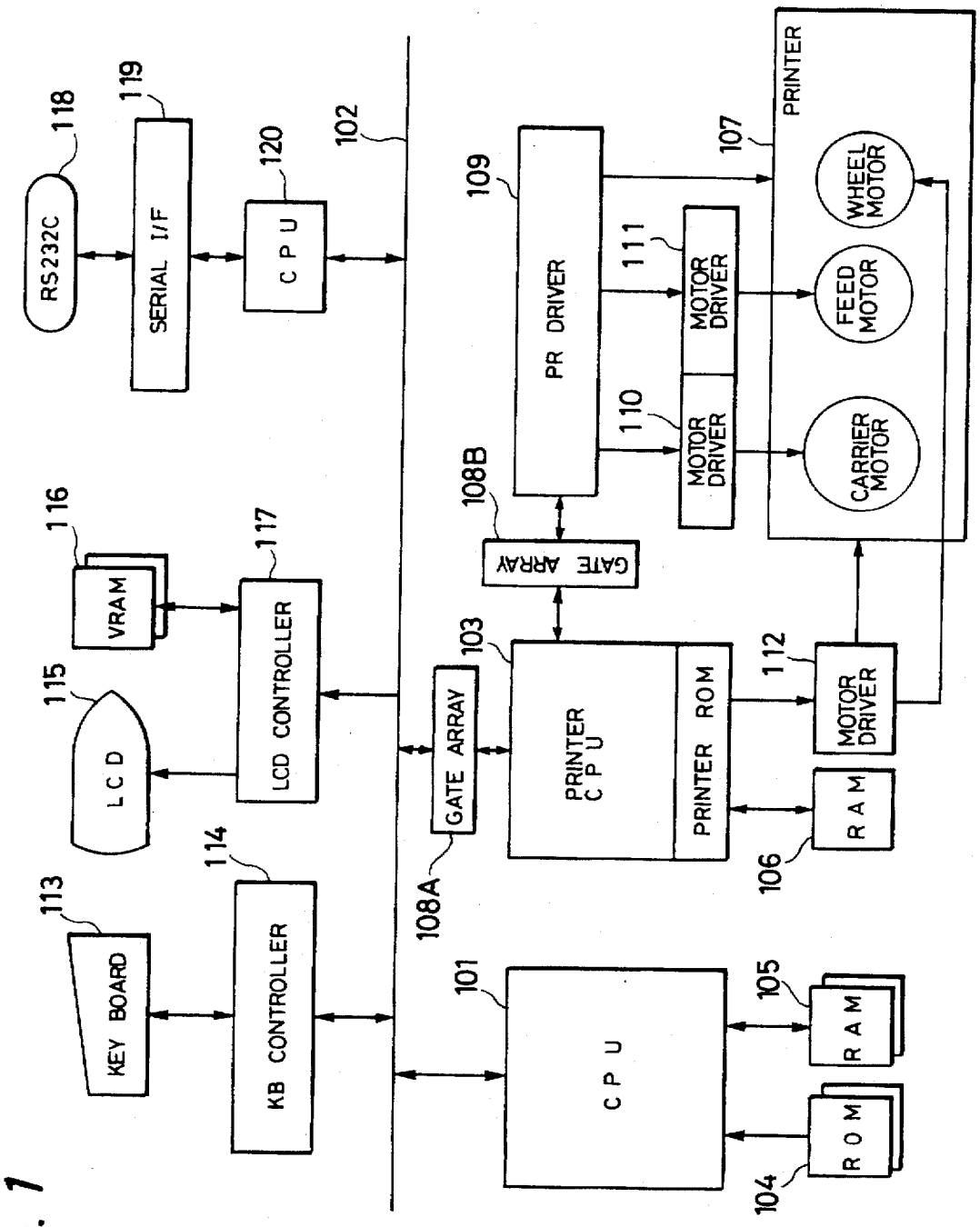
FIG. 1 is a block arrangement diagram of an embodiment of the invention.
Figure 2:
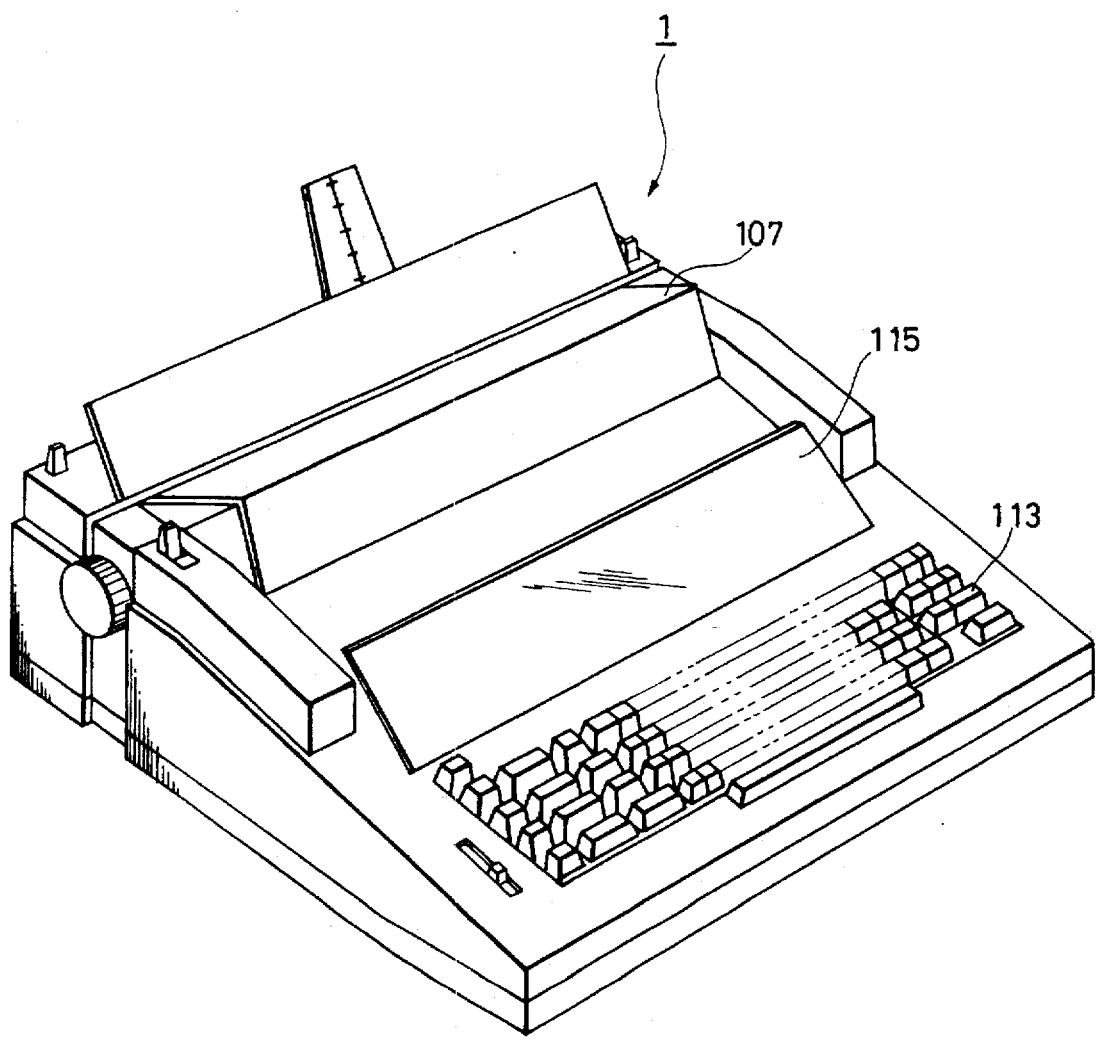
FIG. 2 is an external perspective view of the embodiment of the invention.

In this embodiment, an electronic typewriter which can display 4 lines×80 characters (10 pitch) by a liquid crystal display (LCD) is used. FIG. 2 shows an external perspective view of this typewriter. In the diagram, reference numeral 1 denotes an electronic typewriter. An explanation will now be made with reference to FIG. 1 showing a schematic block diagram of the embodiment.

In the diagram, reference numeral 101 denotes a CPU to control the electronic typewriter 1 in the embodiment; 102 denotes a bus; and 103 denotes a printer CPU which receives commands from the CPU 101 through the bus 102 and a gate array 108A and controls the printing operation. Operating programs of the CPU 101, various kinds of programs, and a pitch correction table shown in FIG. 28 are stored in an ROM 104. The printer CPU 103 has therein a program for an operation command regarding the printing output. Reference numeral 105 denotes an RAM having a work area necessary for the operation of the CPU and a buffer, a CCNO memory, and the like, which will be explained hereinafter. The RAM 105 also stores error information. Reference numeral 106 indicates an RAM for the printer CPU 103 and 107 represents a printer. In the printer 107, a print command from the printer CPU 103 is sent to a printer driver 109 through a gate array 108B. The operations of a carrier motor and a feed motor are controlled by motor drivers 110 and 111. The operation of a wheel motor is controlled by a motor driver 112.

A CPU can be also used in place of the motor driver 112. Further, the exchange of a type wheel and the like in the printer 107 are directly controlled by the printer driver 109.

Reference numeral 113 denotes a keyboard to input characters such as symbols, alphabets, and the like. The keyboard 113 is controlled by a keyboard controller 114. A liquid crystal display (LCD) 115 outputs liquid crystal display data stored in a video RAM (hereinafter, referred to as a VRAM) 116. The LCD 115 is controlled by an LCD controller 117. A communication interface 118 consisting of RS232C performs the communicating function through a serial interface 119. The communication control is performed by a CPU 120.

(Schematic arrangement of the keyboard)

An arrangement of the keyboard 113 will now be described with reference to FIG. 3.

In the diagram, reference numeral 2 denotes a key ("cursor UP" key) to shift a cursor up; 3 indicates a key ("cursor DOWN" key) to shift the cursor down in the vertical direction; 4 denotes a key ("cursor LEFT" key) to shift the cursor to the left; 5 denotes a key ("cursor RIGHT" key) to shift the cursor to the right; 6 denotes a "SET" key; 7 denotes a "CODE" key to perform various kinds of operations by being combined with other keys; 8 denotes a "BACK SPACE" key (BSP); 9 denotes a "DELETE" key (DEL); 10 denotes a "RETURN" key (RTN); 11 denotes a "SPACE" key (SPACE); 12 denotes a "BACK TRACE" key. (BTR) to shift the cursor to the input characters in accordance with the inputting order; and 13 denotes a "FONT" key to switch the font of characters which can be input.

Figure 13:
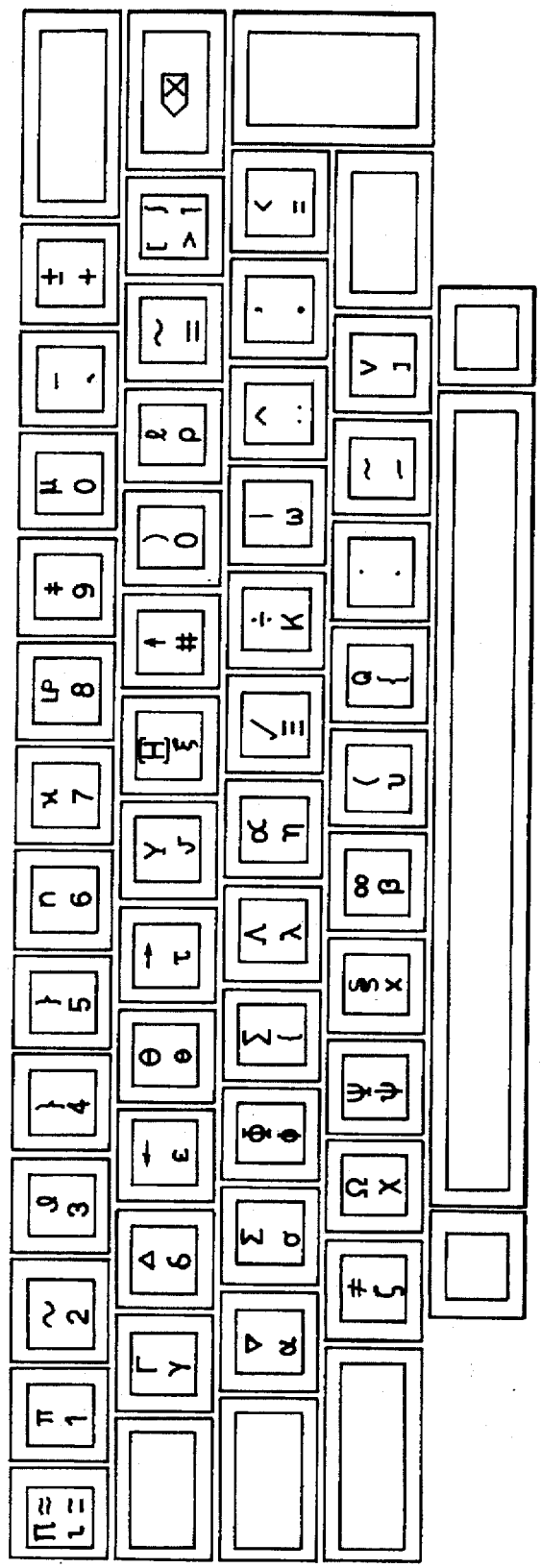

On the other hand, as a keyboard, it is also possible to provide a keyboard only for use of special characters as shown in FIG. 13.

(Description of the printing state)

In the electronic typewriter in the embodiment, five daisy wheels according to the character pitches (e.g., 10 pitch, 12 pitch, 15 pitch) which are used can be held. An arbitrary one of these daisy wheels can be selected and used for printing. A fundamental arrangement of the printer 107 to print and its operation will now be described.

Figure 4A:
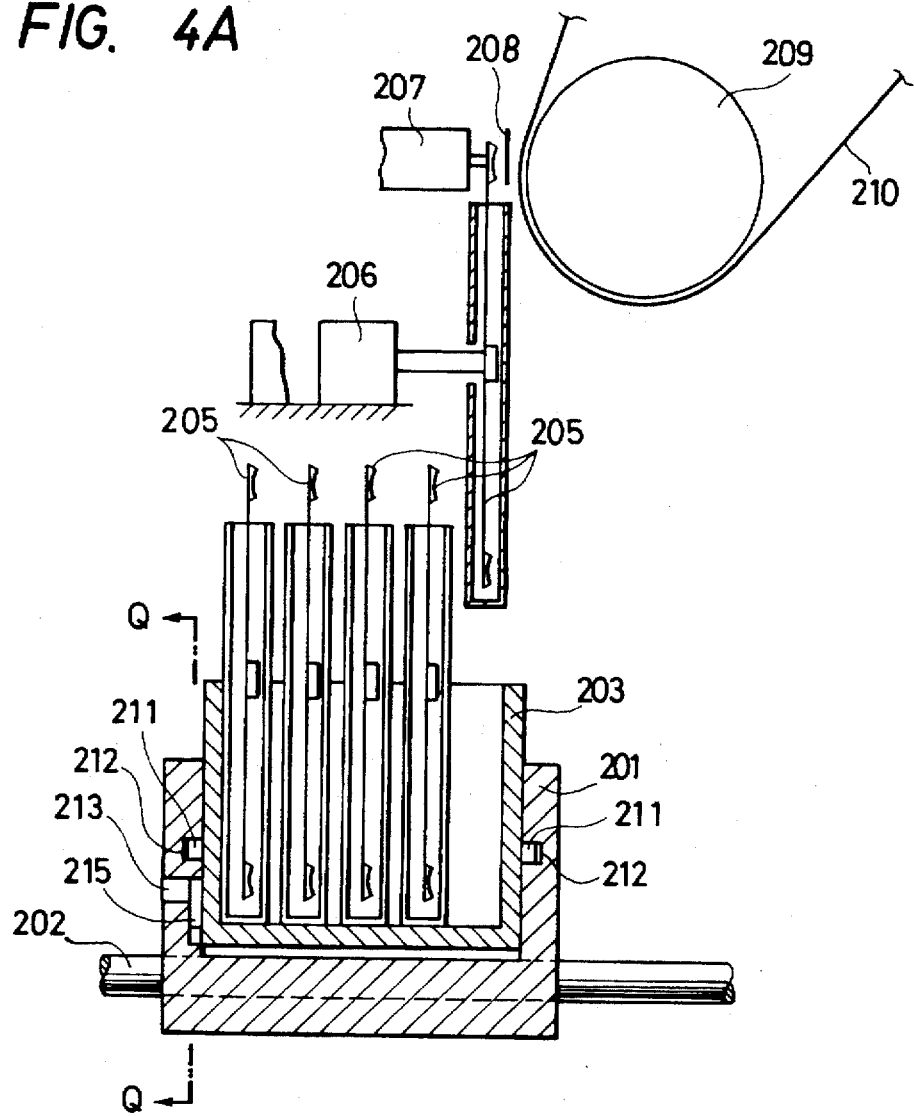
Figure 4B:
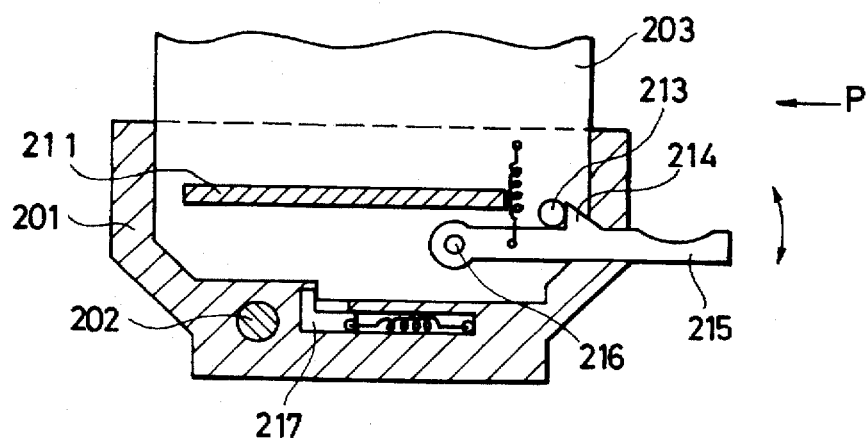

First, FIG. 4A shows a part of the type wheel type printer 107. In the diagram, a wheel magazine 203 has a space sufficient to enclose five daisy wheels 205. An arbitrary one of the daisy wheels 205 is selected and the types are positioned by a wheel motor 206. After a desired type to be printed is determined, a platen 209 is moved in the axial direction and the back side of the type is hit by a hammer 207, so that the symbol or character corresponding to this type can be printed through an ink ribbon 208 onto a print paper 210 wound around the platen 209. On the other hand, the wheel magazine 203 is moved along a shaft 202 in the front or back direction (to the left or right in FIG. 4A) of the platen 209. The daisy wheel 205 can be exchanged and the next printing operation can be performed. The wheel magazine 203 is inserted into an enclosing base 201 from the front side of the diagram of FIG. 4A and fixed. FIG. 4B is a cross sectional view taken along the line Q—Q in FIG. 4A and shows a state in which the wheel magazine 203 is inserted into the enclosing base 201 from the direction indicated by an arrow P. Reference numeral 211 denotes projecting portions of the wheel magazine 203. The projecting portions 211 slide in grooves 212 formed in the enclosing base 201, thereby positioning it. A lever 215 is provided to fix the wheel magazine 203 which rotates around a point 216 formed on the enclosing base 201 as a rotational center.

When the wheel magazine 203 is enclosed, it is depressed downward by a projecting portion 213 of the wheel magazine 203. After the wheel magazine 203 is enclosed, the projecting portion 213 is stopped by a projecting portion 214, thereby preventing the wheel magazine 203 from being returned.

Therefore, to take out the wheel magazine 203, it is necessary to depress the lever 215. On the other hand, a lever 217 applies a force in the direction opposite to the direction of the arrow P and functions so as to push out the wheel magazine 203 when the wheel magazine 203 is taken out.

Figure 5:
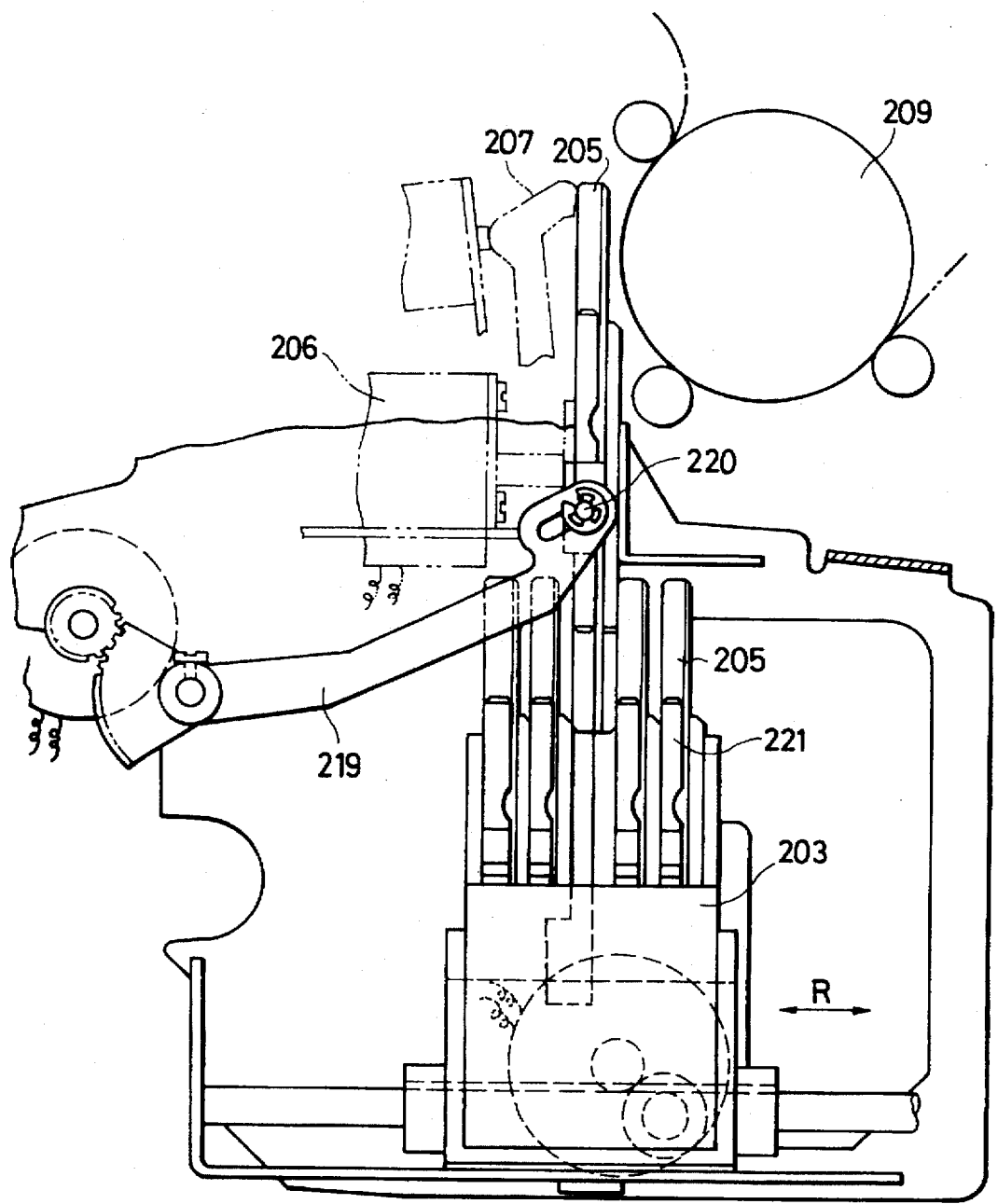
FIG. 5 is a schematic side elevational view when it is seen from the side of a carrier.

A method of attaching the daisy wheel 205 will now be described with reference to FIG. 5 showing a side elevational view of a carriage.

In this figure, reference numeral 221 indicated at an almost central position denotes a wheel cartridge to enclose the daisy wheels 205. A central hole 220 is formed in the lower portion of the wheel cartridge 221. The central hole 220 supports a contact to which an up/down lever 219 adapted to be vertically movable is hooked. The shaft of the wheel motor 206 is fitted into the central hole 220. In other words, the central hole 220 is formed to set the wheel cartridge 221 to the wheel motor 206. In the diagram, R indicates a moving direction of the wheel magazine 203. This moving direction is perpendicular to the moving direction of the carrier. When the wheel magazine 203 has moved to the position of a desired wheel cartridge 221, the up/down lever 219 descends and the up/down lever 219 and the central hole 220 of the wheel cartridge 221 are hooked. When the up/down lever 219 ascends to a predetermined position, the rising operation is stopped. The wheel motor 206 then moves forward (in the direction perpendicular to the moving direction of the carrier). The shaft of the wheel motor 206 is inserted into the shaft hole of the daisy wheel 205. The up/down lever 219 keeps the wheel cartridge 221 and descends by a predetermined distance, thereby allowing the wheel motor 206 to rotate. To return the daisy wheel 205 to the wheel magazine 203, the operations opposite to the foregoing operations are executed. First, the up/down lever 219 ascends and the daisy wheel 205 is inserted into the wheel cartridge 221. Next, the wheel motor 206 moves backward, thereby pulling the shaft of the wheel motor 206 out from the shaft hole of the daisy wheel 205. The up/down lever 219 descends until the wheel magazine 203 and the wheel cartridge 221 is inserted into the wheel magazine 203. In this manner, the returning operations are finished. In this case, of course, the empty position in the wheel magazine 203 (i. e., the enclosing position of the daisy wheel) is stored.

In the printing mode, the daisy wheel 205 attached to the shaft of the wheel motor 206 is rotated to set a proper type to the position of the hammer 207. The hammer 207 hits this type of the daisy wheel 205, thereby effecting printing. Thereafter, the carrier is moved by the distance of only the proper character width. In this manner printing operations similar to those in the ordinary electronic typewriter are executed.

Figure 6A:
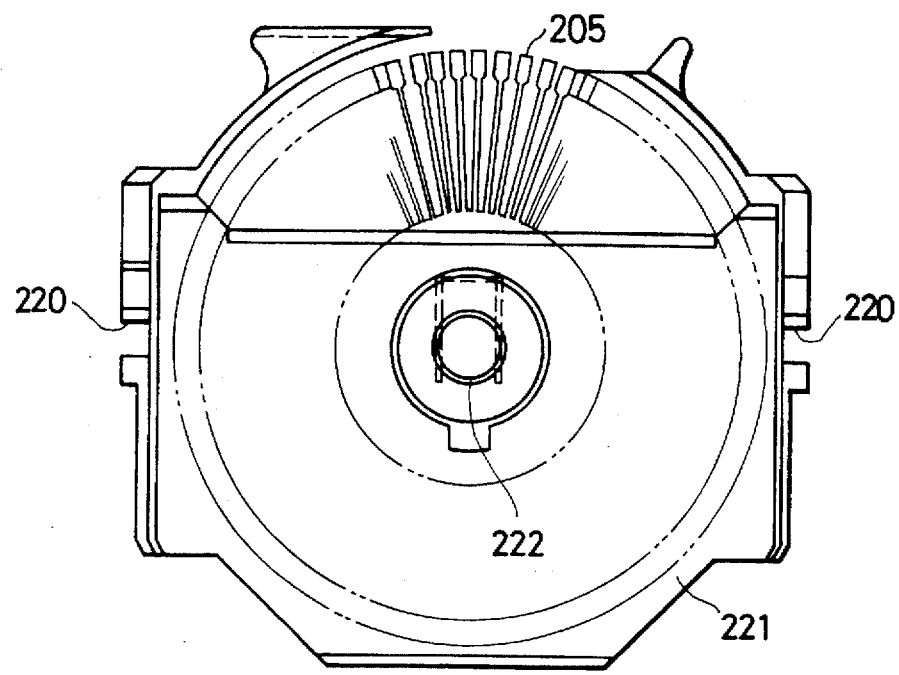
FIGS. 6A, 6B, and 6C are diagrams for explaining the relation between a daisy wheel and a wheel cartridge.
Figure 6B:
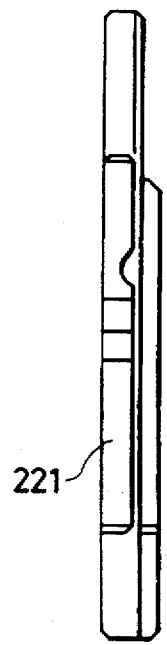
Figure 6C:
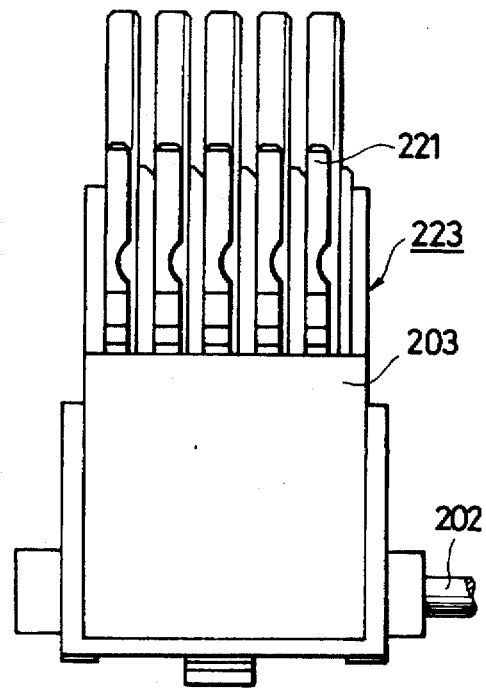

FIG. 6A shows the relation between the wheel cartridge 221 and the daisy wheel 205. FIG. 6B is a side elevational view of FIG. 6A. FIG. 6C shows the state in which the daisy wheel 205 is enclosed in the wheel magazine 203. In the diagrams, reference numeral 222 denotes a shaft hole of the daisy wheel 203 and reference numeral 223 represents the state in which the daisy wheel 205 and wheel cartridge 221 are integrally assembled.

(Shape of the cursor)

The shape of a cursor which is used to input mathematical formulas will now be described.

FIG. 7 shows a cursor which is displayed on the LCD 115. The cursor is set into a shape so as to make it possible to easily indicate an object mark where a character is input. In this embodiment, in a manner similar to the ordinary cursor, when a character is input from the keyboard 113, the character is displayed at the position where the cursor is located on the screen of the LCD 115. Then, the cursor is shifted to the right by a predetermined shift amount. In the case of simply inputting characters, no problem occurs when using an ordinary cursor shape which can be easily seen. However, the embodiment is designed to input characters constituting desired positions and mathematical formula inputted by a user. For this purpose, in the case of inputting a mathematical formula, when characters are input, it is necessary to finely position the characters such as a fraction, a superscript, or the like. Therefore, the cursor is set into the shape as shown in FIG. 7. The positioning of characters is performed on the display by using this cursor. At this time, if the positional relation of a character is clear for the cursor, the character can be easily input. FIGS. 8A to 8I illustrate examples of different characters. FIG. 8A shows "8" for superscript which is included in the daisy wheel of symbols. The superscript is displayed in the upper portion of the cursor and the vertical line of the cursor passes through the center of the character. In a manner similar to the above, characters are input to the positions as shown in FIGS. 8B to 8I. For example, FIGS. 8F, 8G, and 8H show a character "m" which is displayed at 10-pitch, 12-pitch, and 15-pitch, respectively. FIG. 8I shows an underline. In this manner, the position of an input character is clarified by lateral and vertical lines in the cursor. Thus, when a mathematical formula as shown in FIG. 9 is input, by previously displaying object marks by using the cursor and then by inputting the mathematical formula, the characters can be easily input to the accurate positions where they should be input.

(Relations among the display characters, the printing type, and the cursor)

Figure 10A:
Figure 10B:

In the embodiment, the relative characteristics (size, width, height, etc.) of the display characters on the display and the relative characteristics (size, width, height, etc.) of the printing types which are used in the actual printing operations coincide. As shown in FIGS. 10A and 10B, in the case where the characters are input so as to have the relation as shown in FIG. 10A on the display, they are also printed as shown in FIG. 10B with the similar relation. That is, when a character "N" is input after a character "A" on the display by moving the character "N" down by 9/96 inch, the character "N" is actually printed after the character "A" by also moving the character "N" down by 9/96 inch. In this case, the height of the character "N" is not printed at a position higher than the display character and does not overlap the character "A" by widening the character "N".

Figure 11:
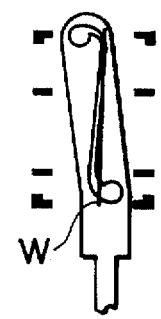

On the other hand, FIG. 11 shows the relation between the cursor and the printing type. By setting such that the center of the actual type passes through the central vertical line of the cursor, a printing reference point W of the type can be set to a reference point of the cursor. Therefore, by managing the input characters by using the reference points of the cursor, the relative positional relations with the other characters can be also maintained upon printing.

(Displaying method of the cursor and characters)

Figure 12:
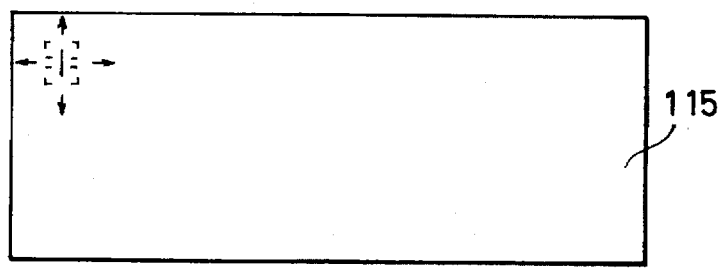

When characters are input from the keyboard 113, they are displayed on the display screen of the LCD 115. In the necessary situation, the cursor is always displayed as shown in FIG. 12. The displaying method will now be explained hereinbelow.

Figure 14:
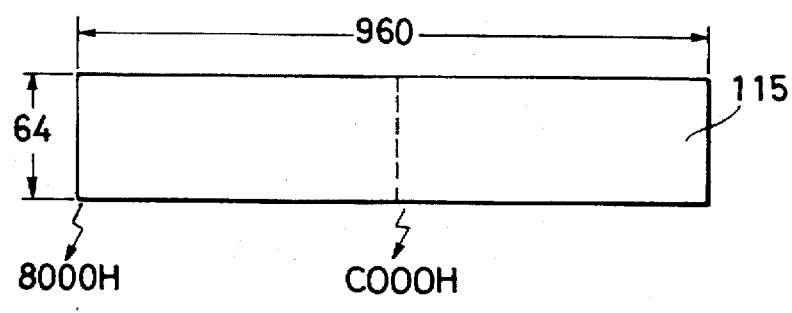
Figure 15A:
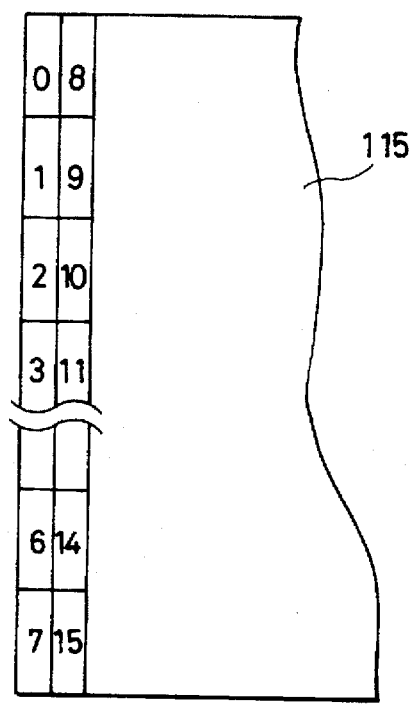
Figure 15B:
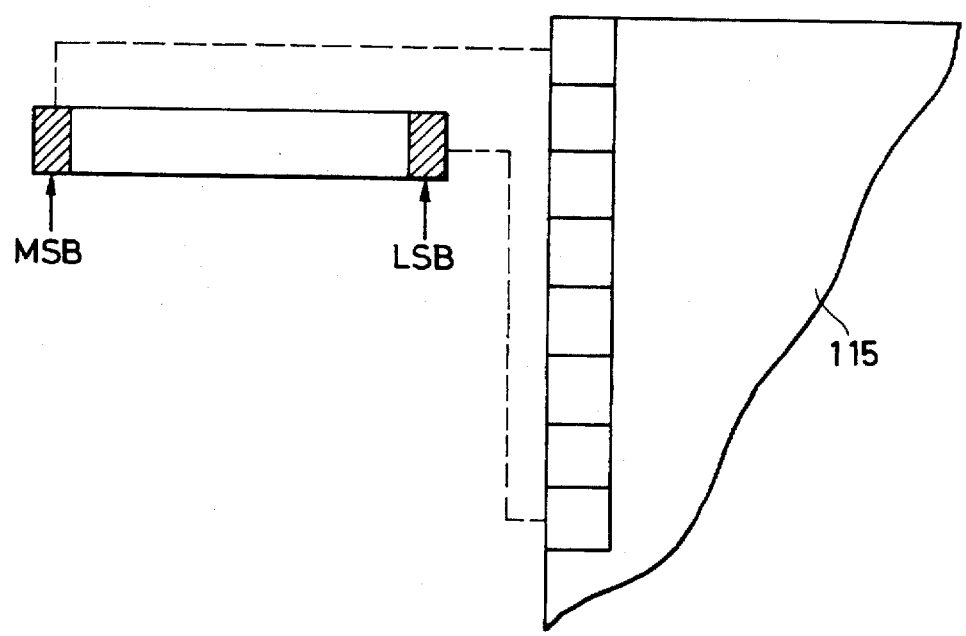

The LCD 115 which is used in the embodiment consists of 64 dots×960 dots. The LCD 115 is used to display 4 lines×80 characters (10 pitch). Therefore, the size in height per dot is set to 1/96 inch and the lateral size per dot is set to 1/120 inch. On the other hand, Two VRAMs 116 are provided in correspondence to the LCD 115. Addresses 8000H to 9FFFH in a hexadecimal notation are assigned to one of the VRAMs 116. Addresses C000H to DFFFH are assigned to the other VRAM 116. As shown in FIG. 14, each VRAM is divided into the left half on the display and the right half of the LCD. On the other hand, for the relation in the memory between the dots and the VRAM 116, as shown in FIG. 15A, the number of addresses in the VRAM 116 increases in the height direction of the LCD 115. Further, in FIG. 15B, the LSB in one address corresponds to the lowest point and the MSB corresponds to the highest point. For instance, assuming that the third bit (the fourth bit from the LSB) in address 8004H is set to "1", the leftmost one dot of the 37th dot from the top is lit on.

The displaying method of characters and cursor will now be explained.

Figure 16:
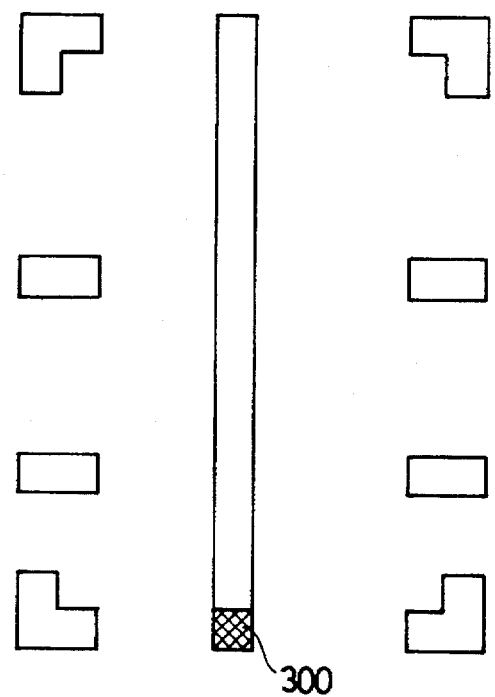

First, the cursor and characters can be set at arbitrary positions on a dot unit basis. Therefore, a buffer for two lines and one character is provided to display the characters and cursor. The input character information set in the buffer is stored through the OR into the VRAM 116. As a practical method, as mentioned above, the cursor and the reference point of the printing character are made coincident. The input characters and cursor are managed by using the coordinates on the display screen of the reference point. In FIG. 16, 300 as a value to be managed has the X and Y coordinates on the display. Therefore, the X coordinate can be set to values from "0" to "959" and the Y coordinate can be set to values from "0" to "63". The sizes of the character and cursor are set to one kind of 16 dots in the height direction and to three kinds of 12 dots (10 pitch), 10 dots (12 pitch), and 8 dots (15 pitch) in the lateral direction. As explained above, assuming that the cursor in FIG. 16 is set to 10 pitch, five dots exist to the left end and fifteen dots exist to the top end. Therefore, in the case of 10 pitch, as reference points, the X coordinate can be set to values from "5" to "953" and the Y coordinate can be set to values from "15" to "63". A buffer of the size which corresponds in the height direction by two characters of 10 pitch is set. All of the reference points in the buffer are made coincide with the reference points of the pitch of the character. A pattern of each character is developed in the buffer.

Figure 17A:
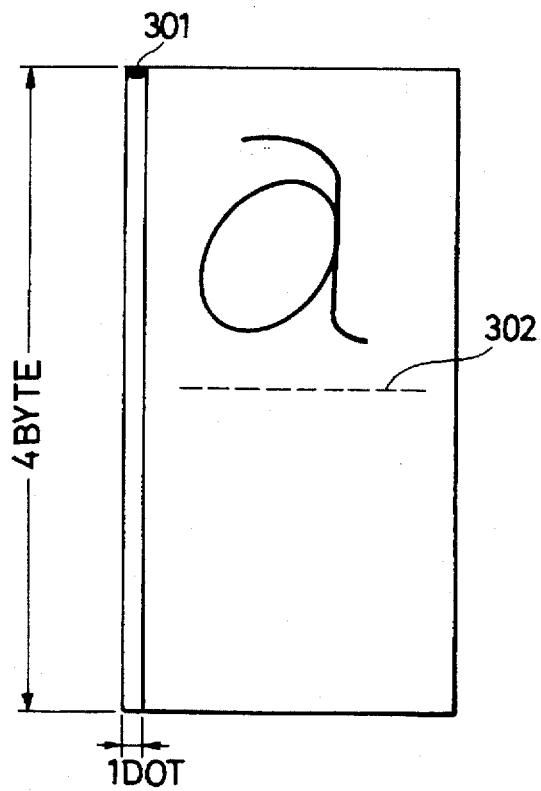
Figure 17B:
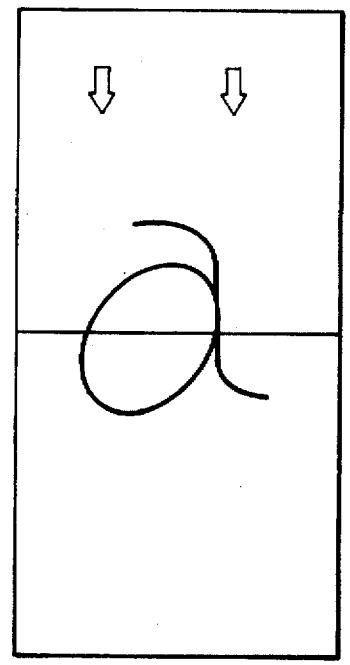
Figure 18:
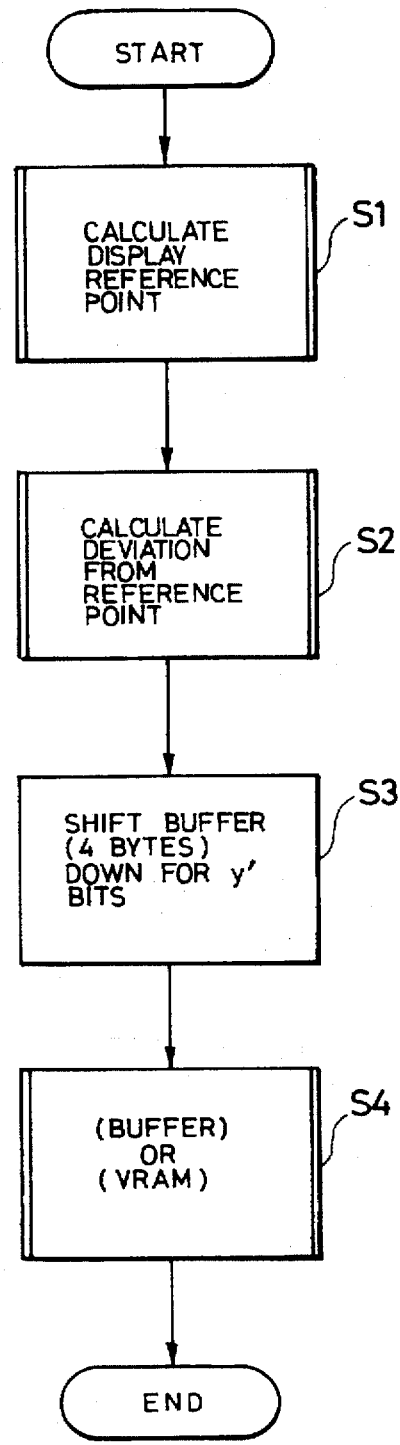
FIGS. 18, 20, 21A to 21L, 27, and 30 are flowcharts for explaining the operation of the embodiment of the invention.

Practical examples will now be explained hereinbelow with reference to FIGS. 17A and 17B. In the diagrams, reference numeral 301 indicates a reference point of the character pitch. Consideration is now made of the case where a character "a" is displayed to the reference point of the X coordinate "15" and Y coordinate "40"; it is necessary to first obtain the reference point for display. The method of displaying the character "a" will be described hereinbelow with reference to a flowchart of FIG. 18. It is assumed that the fundamental operations are similar to those in a conventional electronic typewriter.

This display reference point can be obtained by the following method in step S1.

$$X'=X-5=15-5=10$$

$$Y'=Y-15=40-15=25$$

Therefore, when the X and Y coordinates are set to "15" and "40", the X' and Y' coordinates of the display reference point are set to "10" and "25", respectively.

Figure 19:
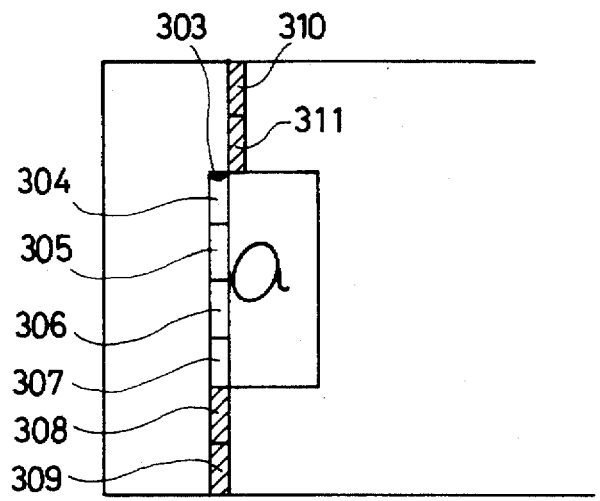

Next, in the case of displaying the character "a" on the basis of this display reference point, it is necessary to obtain a downward deviation amount, in other words, a deviation amount to the next line. For this purpose, Y' is divided by 16 dots corresponding to one character, thereby obtaining the quotient and remainder. In this case, the quotient denotes the number of lines from the top and the remainder indicates the number of shift bits to the downward position. In brief, assuming that Y' coordinate/16=y and the remainder is Y', y=25/16=1 and y'=9. Therefore, the display reference point is located on the second line (the first line) from the top and, further, it will be understood that the character is deviated downward by nine dots (step S2). Therefore, the character "a" developed in the buffer (FIG. 18A) is shifted down by nine bits on a 4-byte unit basis. (For one character, 16 dots in the height direction=16 bits=2 bytes) FIG. 17B shows the result of the shift (step S3). The OR of the content of the buffer and the content of the VRAM 116 are calculated and the resultant data are displayed. Since the VRAM 116 has eight bytes in the height direction, the OR of four bytes in the buffer and the VRAM 116 are calculated, the address in the VRAM 116 is skipped by four bytes, and the OR of four bytes in the buffer and the VRAM 116 are again calculated (step S4). On the other hand, in FIG. 19, the OR of the contents of four bytes in buffers 304, 305, 306, and 307 and the VRAM 116 are calculated. Thereafter, hatched portions 308, 309, 310, and 311 in the diagram are skipped and the OR of the contents in the next buffer and the VRAM 116 are further calculated. When the cursor is located at the lowest position on the screen and a character is displayed at this position, the OR of only the upper half portion in the buffer are calculated. In this manner, the cursor or character can be displayed on an arbitrary position on the display. Display pattern data of the cursor and character are stored in forms which can be easily developed in the buffers. For example, in the case of the cursor of 10 pitch, the display pattern data are stored from the left as follows
11000010000010011B, 10000010000010001B, 0000000000000000B, 0000000000000000B, 0000000000000000B, 1111111111111111B, 0000000000000000B, 0000000000000000B, 0000000000000000B, 0000000000000000B, 10000010000010001B, 11000010000010011B
(these numerals are binary). These data are hereinafter referred to as CG. These CG are stored in the ROM 104. For the display of the cursor and characters, to prevent deletion of information which has already been displayed on the display, the OR of the contents in the buffer and the VRAM 116 are calculated.

Figure 20:
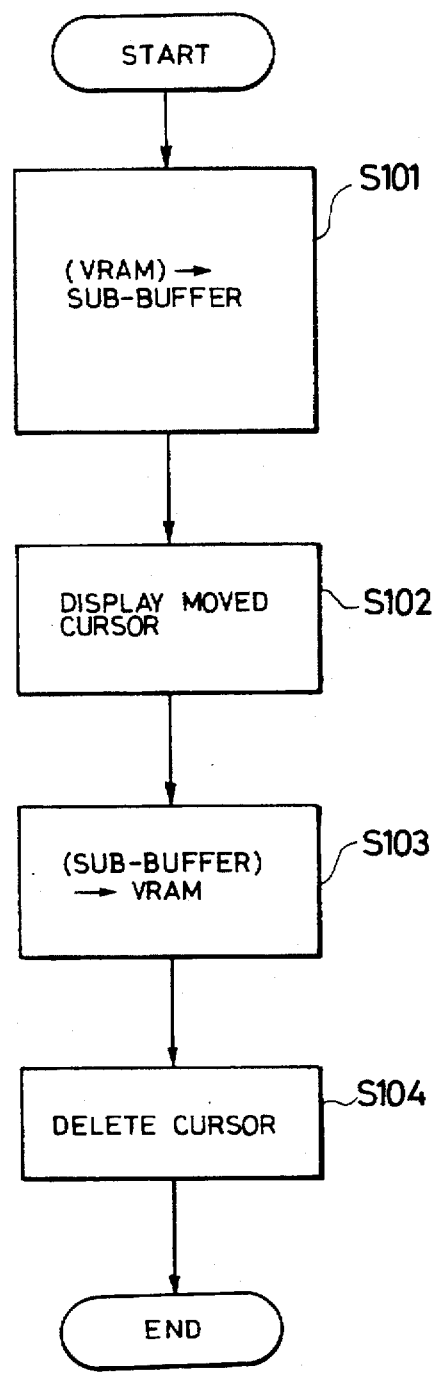

Further, in the case of the cursor, after the cursor was shifted, it is necessary to display the original content. Therefore, a processing flow as shown in FIG. 20 is used. First, a point on the display where the cursor should be displayed is obtained. This point is the foregoing reference point. Further, the display reference point is obtained. The processes opposite to those in the method of displaying the cursor and characters are performed by using the display reference point. First, the information in the VRAM 116 is stored in a sub-buffer. The sub-buffer has the same structure and (memory) capacity as those of the foregoing buffer. The information in the VRAM 116 is stored by the amount of 48 bytes of 32 dots in the height direction and 12 dots in the lateral direction from the display reference point (step S101). Next, the cursor is displayed on the screen (step S102). Further, when the cursor is shifted, the content of the sub-buffer is directly transferred to the VRAM 116 (step S103). The cursor is deleted (step S104). (At this time, the foregoing shifting operations are unnecessary.)

(Description of the operations by various kinds of keys)

Figure 21C:
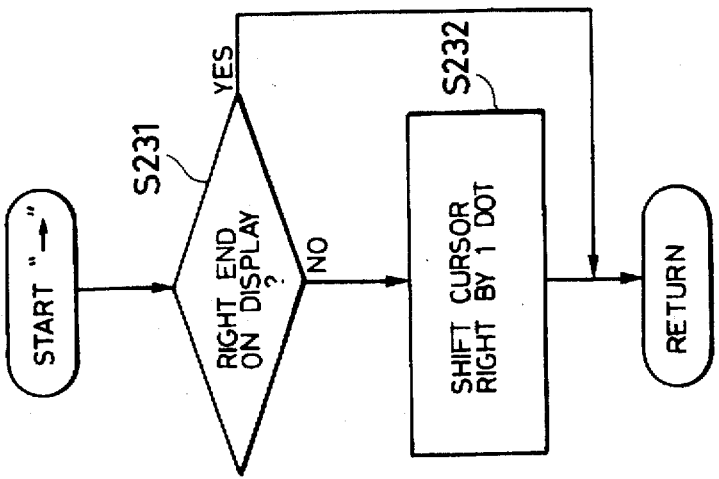

The operations when a mathematical formula is input will now be explained with reference to FIG. 21A.

First, when the mode to input a mathematical formula is set, the cursor is displayed at the home position (the left top end of the display) on the display (step S201). At this time, the X and Y coordinate values of the reference point are X=5 and Y=15. Next, a proper key is input (step S202). The suitable process is executed for every input key (step S203).

Figure 21B:
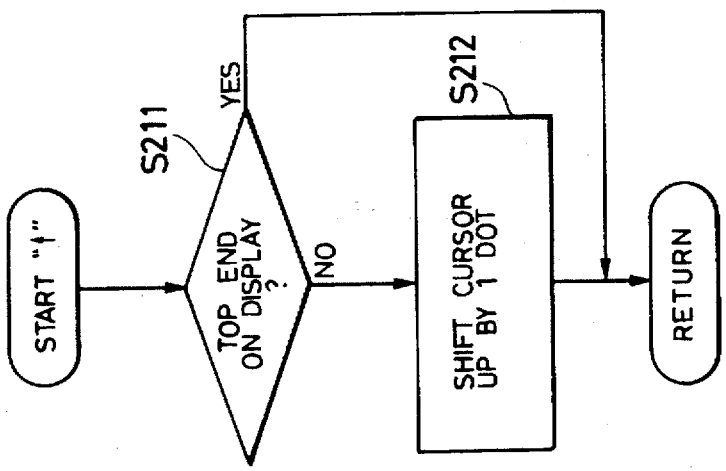
Figure 21A:
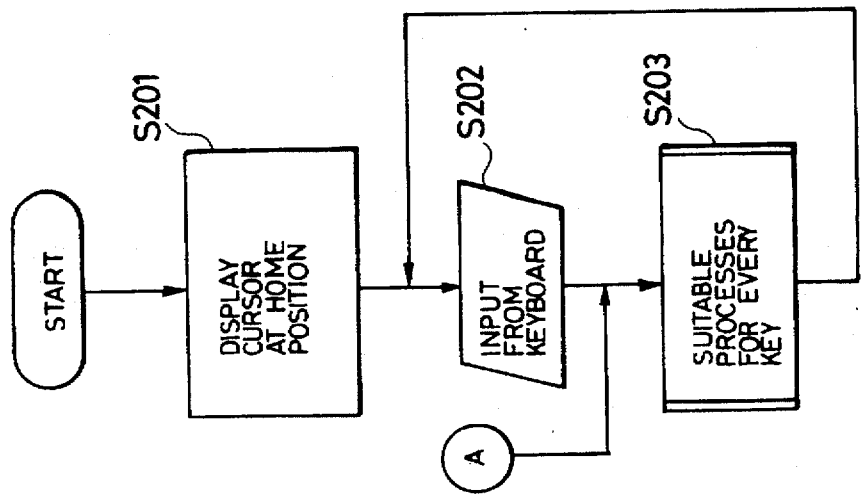
Figure 21F:
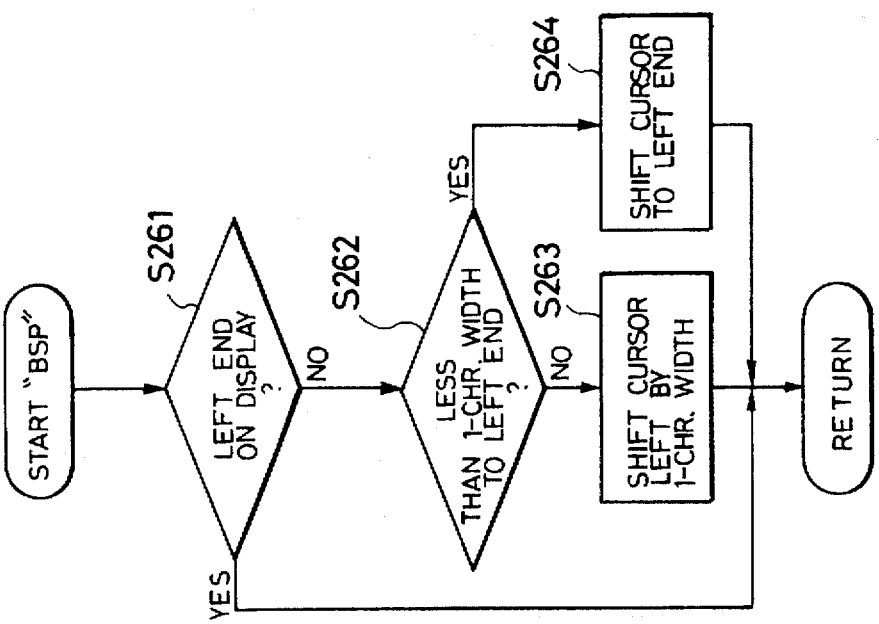
Figure 21E:
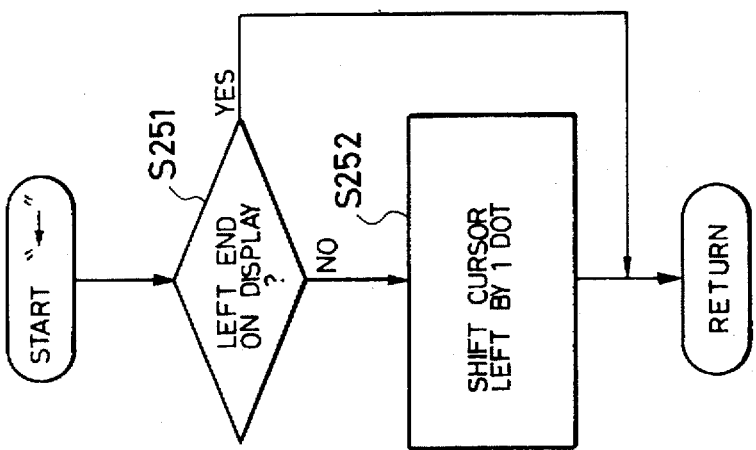
Figure 21D:
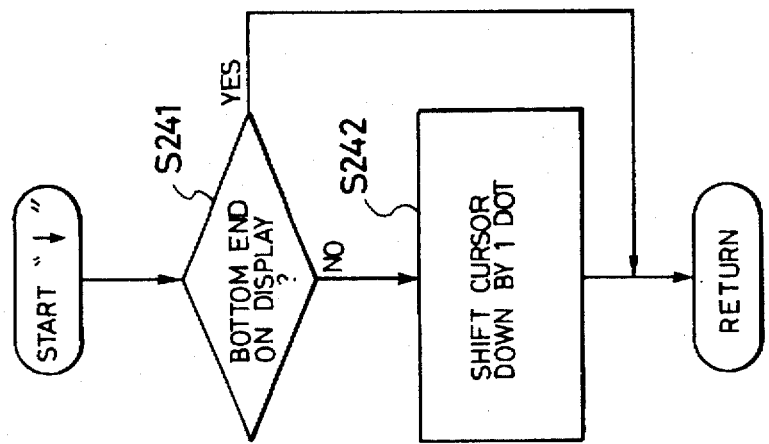
Figure 21G:
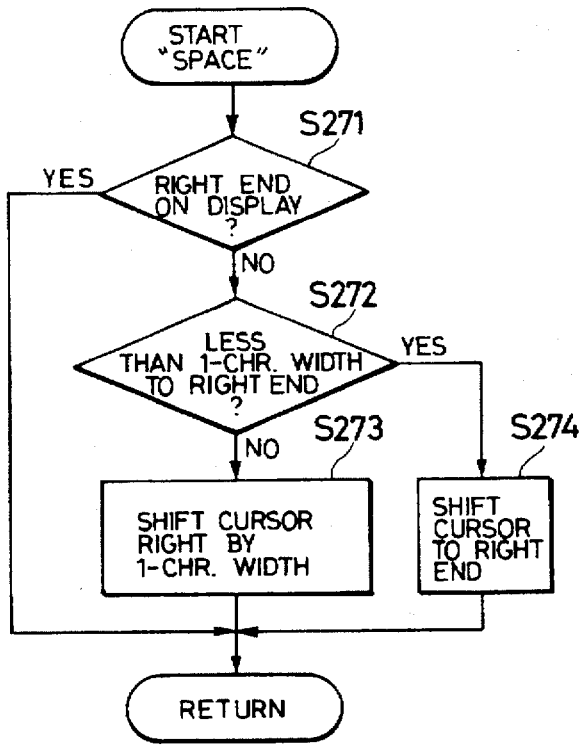
Figure 21H:
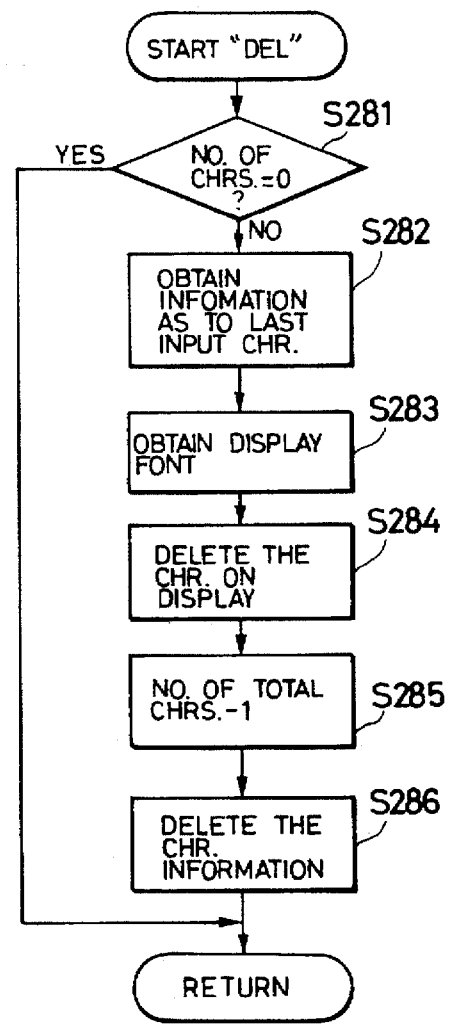
Figure 21I:
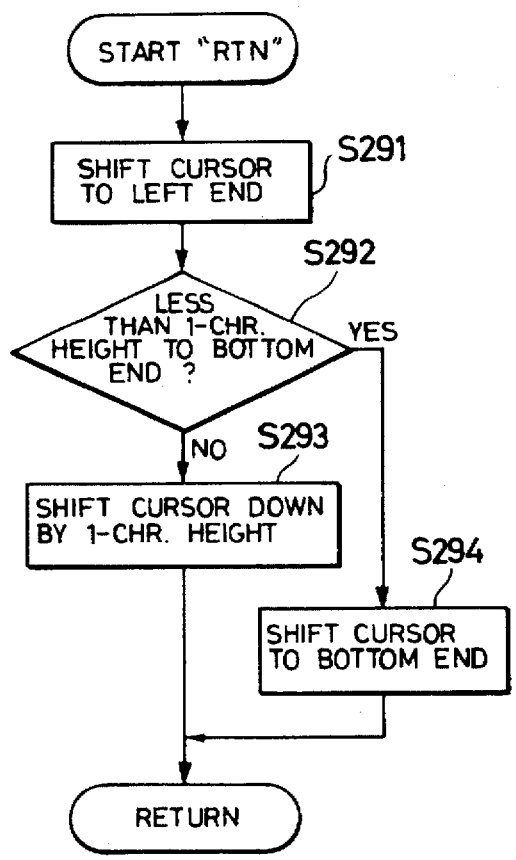
Figure 21J:
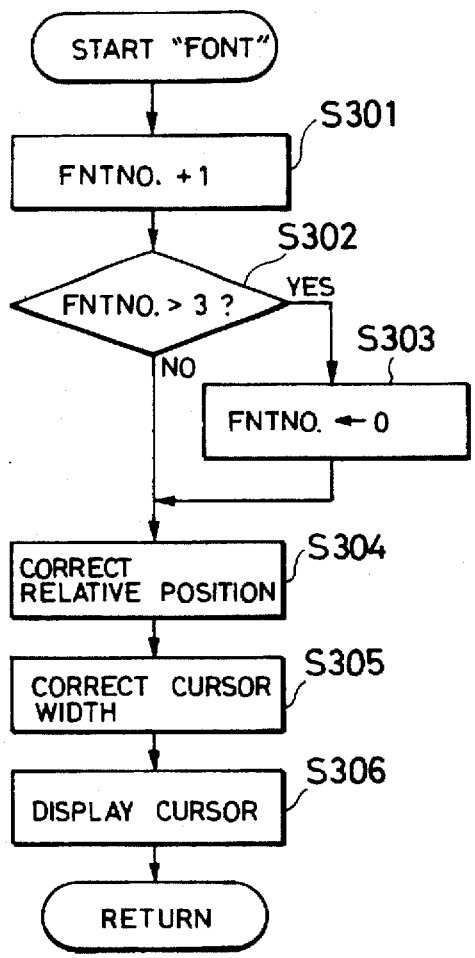

In FIG. 21B, when the "↑" key is input, the cursor is shifted up by one dot (step S212). However, at this time, if the cursor has already been located at the top end on the display (when the value of Y of the reference point is 5), the operation to shift the cursor up by one dot is not performed but the cursor is returned (step S211). On the other hand, in FIG. 21C, the cursor is shifted to the right by one dot (step S232). At this time, if the cursor has already been located at the right end on the display (when the value of X of the reference point is 953), the cursor is not shifted to the right but is returned (step S231). In FIG. 21D, when the "↓" key is input, the cursor is shifted down by one dot (step S242). At this time, if the cursor has already been located at the lower end on the display (when the value of Y of the reference point is 63), the cursor is not shifted down but is returned (step S241). Further, in FIG. 21E, when the "←" key is input, the cursor is moved to the left by one dot (step S252). At this time, if the cursor has already been located at the left end on the display (when the value of X of the reference point is 5), the cursor is not shifted to the left but is returned (step S251). In FIG. 21F, when the "BSP" key ("BACK SPACE" key) is input, a check is first made to see if the cursor has already been located at the left end on the display or not (step S261). If it is not located at the left end and when an interval of one character or longer is detected (step S262), the cursor is shifted to the left by one character (step S263). The movement amount of one character at this time depends on the character pitch of the daisy wheel selected at present. If the 10-pitch daisy wheel is selected, the movement amount is set to 12/120 inch and corresponds to 12 dots on the display. If the cursor is located at a position which is away from the left end on the display by the distance of less than the number of dots corresponding to the character pitch the cursor is shifted to the left end on the display (step S264). In FIG. 201G, when the "SPACE" key is input, the position of the cursor is detected (step S271). A check is made to see if the cursor is located at a position which is away from the right end of the display by less than one character width or not (step S272). If the cursor is away from the right end of the display by one character width or longer, the cursor is shifted to the right by only one character width (step S273). At this time, the shift amount of one character is the same as that of the "BSK" key. Similarly to the "BSK" key, if the cursor is located at a position which is away from the right end on the display by the number of dots corresponding to the character pitch or more, the cursor is shifted to the right end on the display (step S274). In FIG. 21H, when the "DEL" key is input, the characters are deleted on the display from the last input character in accordance with the order opposite to the inputting order. When the "DEL" key is depressed, the character information of the relevant characters is obtained (steps S281 and 282). Thus, since the kind of code of the character, the display location, and the display method are known, the CG are developed in the buffer (step S283). The CG in the buffer are shifted on the basis of the value obtained from the character information (the number of shift obtained from the value of Y of the reference point). "0" and "1" are inverted on the basis of the content of the buffer. The AND of the content of the buffer and the VRAM 116 are calculated and the characters are deleted (step S284). The total number of input characters is reduced (step S285). The character information of the relevant characters is deleted (step S286). In FIG. 21I, when the "RTN" key is input, the cursor is moved to the left end on the display (step S291). Then, a check is made to see if the interval of one character width from the bottom end on the display exists or not (step S292). If the distance of one character or more exists, the cursor is shifted down on the display by one character (16 dots) (step S293). When the cursor is located at a position away from the lower end on the display by one character width or less, the cursor is shifted to the lower end on the screen (step S294). In FIG. 21J, when the "FONT" key is input, the character pitch of the input character is switched and the width of the cursor is also changed. For the character pitches, the font No. 0 is set to 10 pitch, the font No. 1 is set to 12 pitch, the font No. 2 is set to 15 pitch, and the font No. 3 is set to 10 pitch for symbols. When the "FONT" key is first depressed, the font Nos. are changed in accordance with the order of No. 0→No. 1→No. 2→No. 3→No. 0 (steps S301, S302, S303). In FIG. 23A, the width of the cursor is set to 10 pitch. Likewise, it is set to 12 pitch in FIG. 23B and to 15 pitch in FIG. 23C. In this manner, the shape of the cursor differs depending on the pitch. When the "FONT" key is depressed, the width of the cursor changes. However, the reference center of the character pitch of the cursor is the same. Similarly to the characters, the CG of each cursor are stored as three patterns in the ROM 104, respectively.

Figure 27:
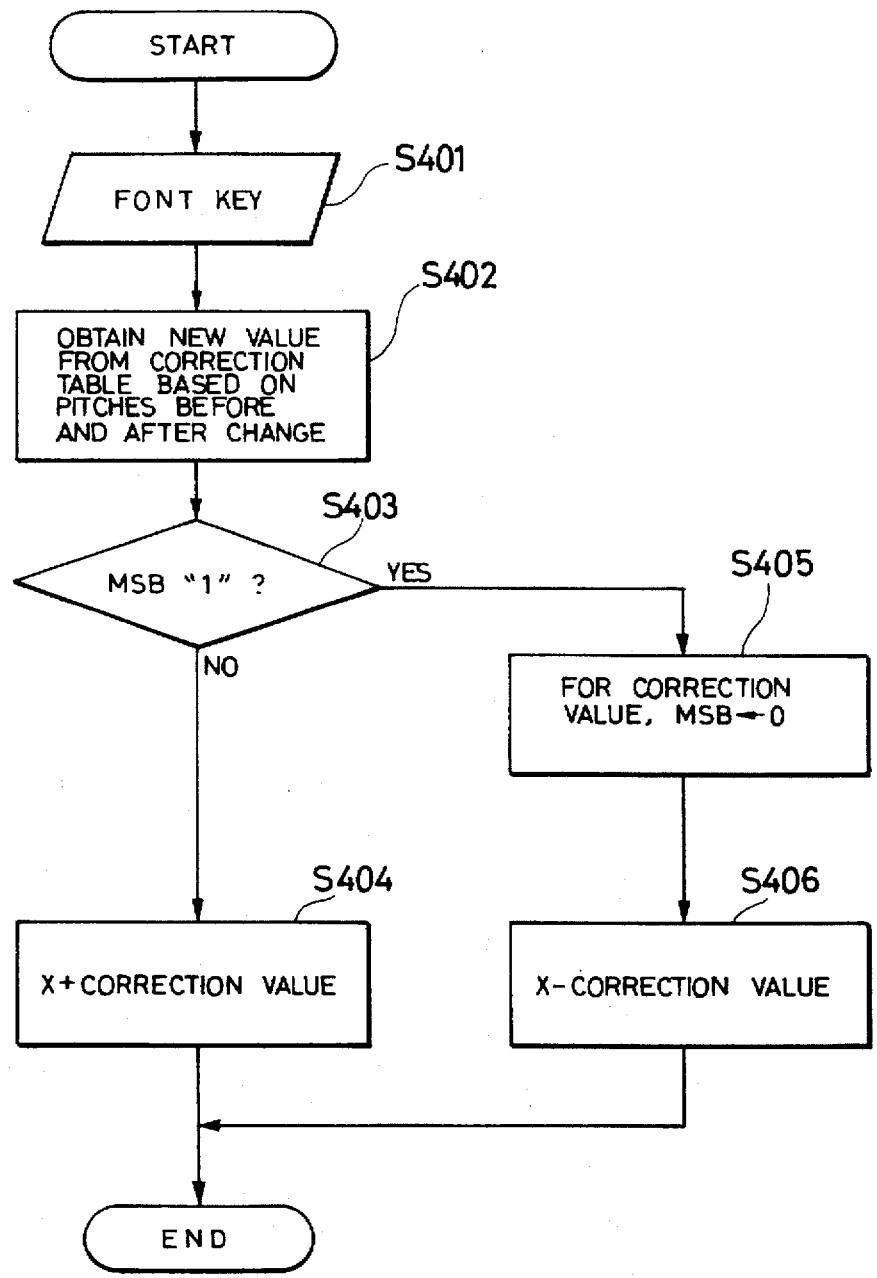

As mentioned above, when a character is input, the cursor is shifted to the right by one character width. This state is shown in FIGS. 24A, 24B, and 24C. First, in the case of 10 pitch (FIG. 24A), A and B are respectively set to 1/10 inch (the distance between the center of the character and the center of the cursor). In a manner similar to the above, in the case of 12 pitch (FIG. 24B) and 15 pitch (FIG. 24C), A' and B' are respectively set to 1/12 inch and A' and B' are respectively set to 1/15 inch. These values correspond to the shift amounts of the center of the cursor according to the character pitches. However, as shown in FIG. 25A, after a character "a" of 15 pitch had been input and the center of the cursor was shifted to the right by 1/15 inch, if the character pitch is switched to 10 pitch, the interval between the character and the cursor becomes too narrow. In addition, since B is set to 1/10 inch for the A of 1/15 inch, there occurs a situation such that the characters before and after overlap. Or, as shown in FIG. 25B, after the character of 10 pitch was input, the center of the cursor is shifted to the right by 1/10 inch. In this case, if the pitch is switched to 15 pitch, the interval between the character and the cursor becomes too wide. This is because B' is set to 1/15 inch for A' of 1/10 inch. In such a case, as shown in FIGS. 26A and 26B, by correcting the interval between the character and the cursor, the proper interval can be derived. This correction will be described by comparing FIGS. 25A and 25B with FIGS. 26A and 26B. Namely, in the case of FIG. 26A, A is corrected from 1/15 inch to 1/10 inch. In the case of FIG. 26B, A' is corrected from 1/10 inch to 1/15 inch. In this manner, the interval of the cursor is widened or narrowed. Due to this, even in the case where the characters of different pitches are mixedly displayed on one display screen, the proper character interval can be also derived. This correcting process (the relative position correction in step S304) is executed and the interval of the cursor is corrected to a desired cursor width and displayed (steps S305 and S306). FIG. 28 shows the pitches before and after the correcting processes shown in FIGS. 24 to 26. This correction processing flowchart can be described with reference to FIG. 27. First, when the "FONT" key is depressed (step S401) and the character pitch is switched, a new value is obtained from the correction value table in which the relation between the character pitches before and after the change is shown (step S402). If a correction value is added to the reference value X with respect to the value in this correction value table, the MSB is set to "0". On the contrary, when it is subtracted from the value X, the MSB is set to "1". The addition or subtraction of the correction value for the reference value X is determined on the basis of the MSB (step S403). When the correction value is subtracted from the reference value X, the MSB is set to "0" (step S405). Only the correction value is subtracted from the reference value X (step S406). On the contrary, in the case of adding, the correction value is added without changing the MSB (step S404). In this manner, even after the change of the pitch (font), the proper interval from the preceding character is held.

Figure 22:
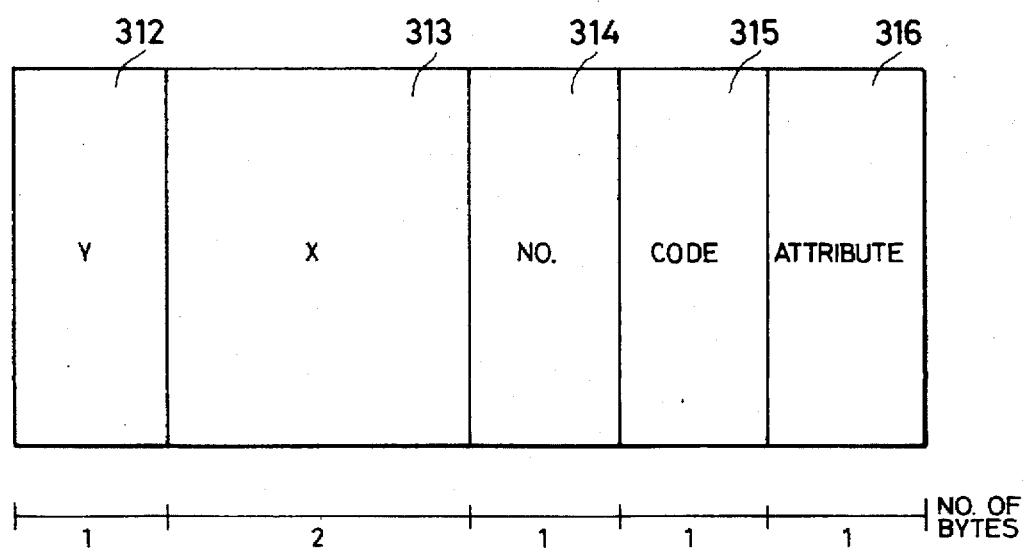
Figure 21K:
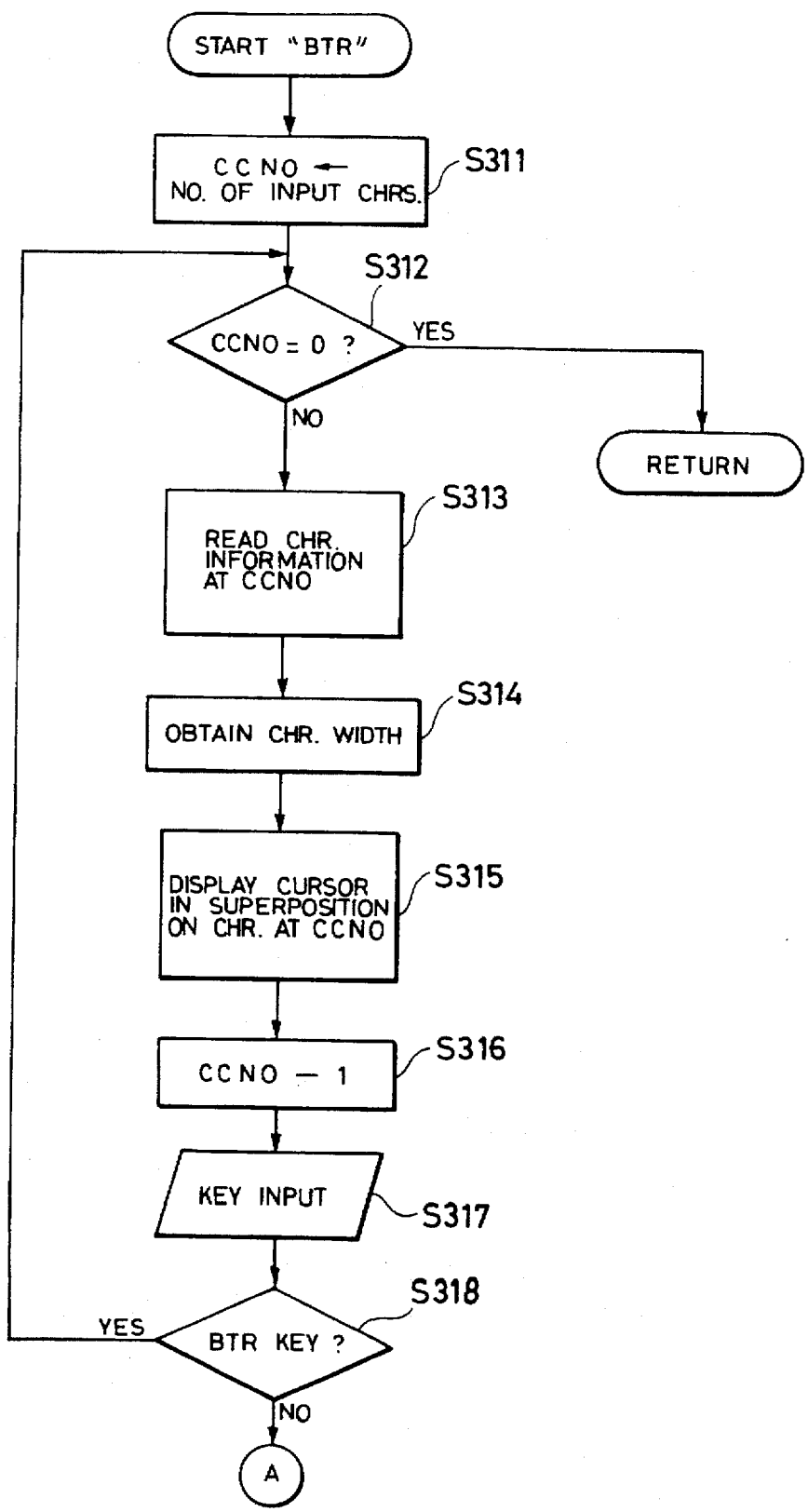
Figure 21L:
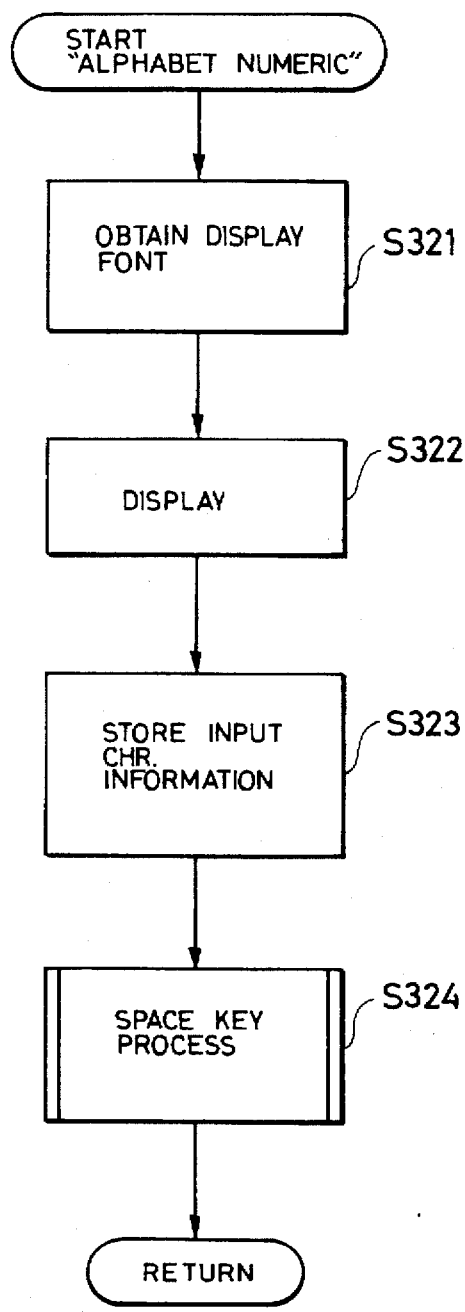
Figure 30:
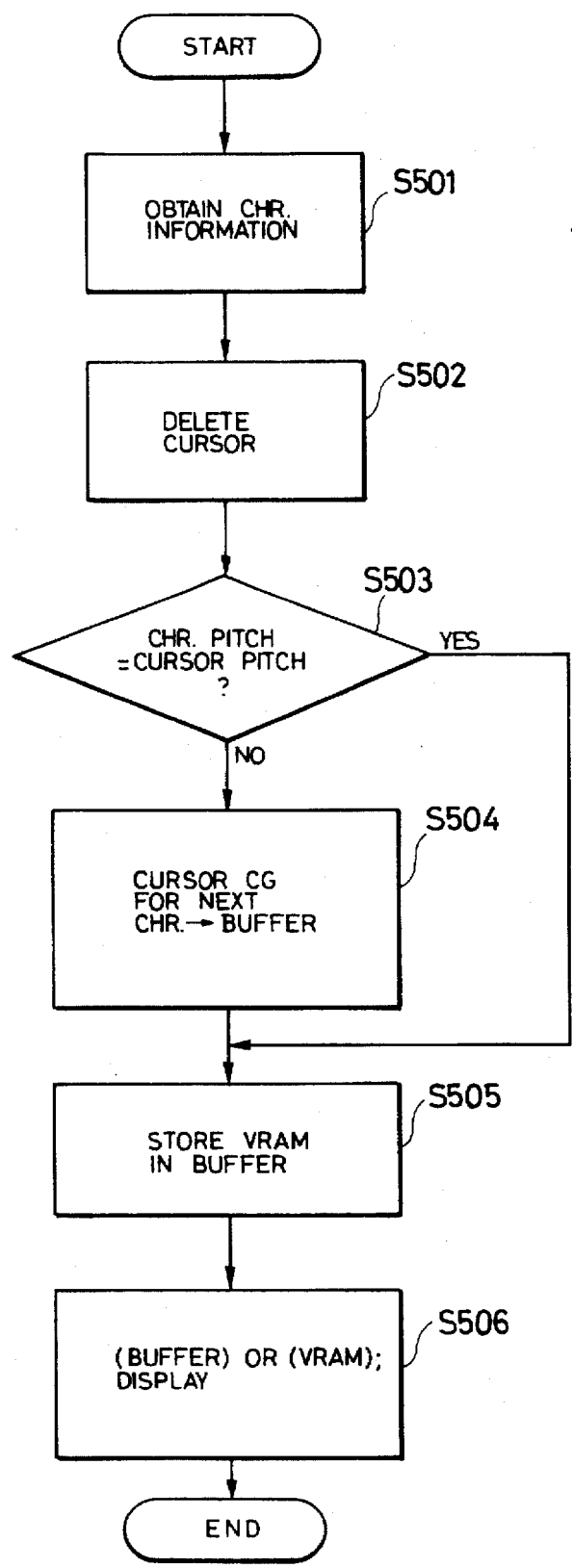

In FIG. 21K, the process when the "BTR" key is input will now be described. First, the "BTR" key is pressed to shift the cursor in accordance with the order opposite to the inputting order of the input characters. (That is, the cursor is shifted in the opposite direction from the last input character.) First, the number of input characters is stored into the memory of CCNO (step S311). If it is determined that the number of CCNO is not "0" (step S312), the character information at CCNO is read out (step S313). The character pitch is obtained on the basis of the character information (step S314). The cursor suitable for this character pitch is displayed in superposition on the character at CCNO (step S315). The CCNO is reduced by "1" (step S316). Then, the apparatus is set to the standby mode until the "BTR" key is pressed (step S317). If the next input key is not the "BTR" key (step S318), the process for the "BTR" key is interrupted. If the "BTR" key is input, step S312 follows and the processes are continued. When the CCNO is set to "0", the processing routine is finished. The cursor is displayed in superposition on the character in accordance with the order opposite to the inputting order. The character pitch when the "BTR" key is depressed is not always coincident with the pitch of the character which has already been input. If the back trace is performed at the pitch when the "BTR" key was pressed, as shown in FIG. 29A or 29B, the cursor of 15 pitch is displayed on the character of 10 pitch or vice versa, so that a sense of incompatibility occurs and they are hard to see. Therefore, in the case of performing the back trace, it is desirable to display the cursor of the same pitch as the character on which the cursor overlaps. For this purpose, as shown in FIG. 21K, the character information is obtained to determine the width of the cursor and the cursor of the suitable width is displayed. The processes in steps S313 to S315 in FIG. 21K are shown in a flowchart of FIG. 30. First, the character information to overlap the cursor is obtained (step S501), thereby obtaining the cursor position (reference position X and Y) and the character pitch. Next, the cursor is deleted (step S502). The next character pitch and the present cursor pitch are compared (step S503). If they are equal, the CG of the cursor stored in the buffer so far are used. If they are different, the cursor CG of the same pitch as the pitch of the next character are newly developed in the buffer (step S504). Next, the information in the VRAM 116 before the cursor is displayed is stored into the sub-buffer (step S505). The sub-buffer is used to delete the cursor. The OR of the content of the buffer and the next character in the VRAM 116 is calculated and the cursor is displayed (step S506). Next, in FIG. 21L, the process when the ordinary "ALPHA NUMERIC" key is pressed will now be explained. First, the input character is displayed on the display screen (steps S321 and S322) and the character information is stored (step S323). The process for the "SPACE" key is executed and the cursor is shifted to the right by one character width (step S324). At this time, in the character information, one character consists of six bytes as shown in FIG. 22. In the diagram, reference numeral 312 denotes the size of one byte and indicates the value of Y of the reference point; 313 denotes the size of two bytes and represents the value of X of the reference point; and 314 denotes the size of one byte to store the inputting number of the input character. The character code is stored in 315. This character code is based on the ASCII code. Reference numeral 316 denotes an attribute and the upper four bits denote the number of selected daisy wheel (No. 0 to No. 3). On the other hand, the lower four bits indicates the font of character. 0000B represents the normal font. 0001B indicates the bold font. The bold font can be designated by the keyboard 113. These information are stored in the RAM 105.

In this embodiment, a frame by the cursor has been given every character. However, the cursor frame can be also enlarged such that the cursor can be converted into a constant pitch for a plurality of characters. That is, by setting the size of the cursor to a multiple of 10, 12, and 15 pitches, for example, the characters as many as the number of characters proportional to the cursor size designated by the keyboard, i.e., the character pitch are set. Or, the cursor is displayed so as to overlap the character which has already been displayed. With this method, a plurality of characters can be together converted into a desired character pitch.

As described above, according to the embodiment of the present invention, it is possible to provide a character processing apparatus which can display characters constituting, particularly, a mathematical formula with a good balance.

What is claimed is:

1. A character processing apparatus comprising:

input means for inputting character information, instruction information for moving a cursor, and character type information;

memory means for storing information;

memory control means for controlling said memory means to store the character information and the character type information inputted from said input means and position information relating to the cursor;

pattern memory means for storing a pattern developed from the character information stored in said memory means, said pattern memory means having a bit map memory;

development control means for controlling the line pitch of a pattern in response to the character type information stored in said memory means and for controlling said pattern memory means to store the developed pattern in the controlled line pitch and the position information; and display means for displaying the pattern stored in said pattern memory means and a cursor to designate a position at which the pattern is displayed on said display means, the position and form of the cursor being changeable with the character type information, said display means having a plurality of pixel display elements each of which corresponds to each bit of the bit map memory of said pattern memory means, the cursor size being changeable in accordance with the character type information input by said input means, said display means displaying different types of characters on the same line determining different cursor forms on the same line, depending on the type of displayed character, so that the cursor has different forms on the same line when characters of different types are displayed on the same line, wherein said display means comprises memory means for storing patterns corresponding to a plurality of character pitches.

2. An apparatus according to claim 1, wherein said input means comprises a keyboard.

3. An apparatus according to claim 1, wherein said display means comprises a display element which can display a character train of a plurality of lines at the same time.

4. A character processing apparatus comprising:

input means for inputting character information and instruction information for moving a cursor;

memory means for storing character information;

memory control means for controlling said memory means to store the character information inputted from said input means and position information relating to the cursor;

image memory means for storing a pattern extending over a plurality of lines developed from the character information stored in said memory means, said image memory means having a bit map memory;

display memory means for storing the pattern developed in said image memory means, said display memory means having a bit map memory;

display means for displaying the pattern extending over a plurality of lines stored in said display memory means and a cursor to designate a position in each of the plurality of lines at which the pattern is displayed on said display means, said display means having a plurality of pixel display elements each of which corresponds to each bit of the bit map memory of said display memory means, said display means displaying different types of characters on the same line determining different cursor forms on the same line, depending on the type of displayed character, wherein said display means comprises memory means for storing patterns corresponding to a plurality of character pitches; and cursor control means for moving the cursor to control the position at which the pattern for character information to be input is displayed, wherein said cursor control means moves the cursor by different amounts of pixels and changes the form of the cursor to be different forms on the same line in response to different types of the character information input by said input means being displayed on the same line and by an amount of a pixel in response to input of the instruction information input by said input means.

5. An apparatus according to claim 4, wherein said input means comprises a keyboard.

6. An apparatus according to claim 4, wherein said display means comprises a display element which can display a character train of a plurality of lines at the same time.

7. A character processing apparatus comprising:

input means for inputting character information, instruction information for moving a cursor, and character size information;

memory means for storing information;

memory control means for controlling said memory means to store the character information and the character size information inputted from said input means;

image memory means for storing a pattern developed from the character information stored in said memory means, said image memory means having a bit map memory;

development control means for controlling a character pitch of a pattern in response to the character size information stored in said memory means and for controlling said image memory means to store the developed pattern in the controlled character pitch;

display memory means for storing the pattern developed in said image memory means, said display memory means having a bit map memory;

display means for displaying the pattern stored in said display memory means and a cursor to designate a position at which the pattern is displayed on said display means, the position being changeable with a character size, said display means having a plurality of pixel display elements each of which corresponds to each bit of the bit map memory of said display memory means, said display means displaying different sized characters on the same line input by said input means determining different cursor sizes on the same line, depending on the size of displayed character, wherein said display means comprises memory means for storing patterns corresponding to a plurality of character pitches; and cursor control means for moving the cursor to control the position at which the pattern for character information to be input is displayed and for controlling the amount of cursor movement to change in accordance with the character size information input by said input means, said cursor control means controlling the cursor size to change to different sizes on the same line in accordance with different character size information input by said input means for different sized characters on the same line.

8. An apparatus according to claim 7, wherein said input means comprises a keyboard.

9. An apparatus according to claim 7, wherein said display means comprises a display element which can display a character train of a plurality of lines at the same time.

10. A character processing apparatus comprising:

input means for inputting character information;

memory means for storing character information;

memory control means for controlling said memory means to store the character information input by said input means;

character-by-character pitch changing means for changing the character pitch for characters on the same line so that characters on the same line have different character pitches;

image memory means for storing a pattern developed from the character information stored in said memory means, wherein said image memory means is adapted to store a pattern developed from character information extending over a plurality of lines;

display memory means for storing the pattern extending over a plurality of lines developed in said image memory means;

display means for displaying the pattern extending over a plurality of lines stored in said display memory means and a cursor to designate a position in each of the plurality of lines at which the pattern is displayed on said display means;

cursor control means for moving the cursor by a character unit upon input of character information and by a pixel unit so as to control the position at which the pattern for character information to be input is displayed, wherein said cursor control means comprises means for instructing the shifting of the cursor on said display means in vertical and horizontal directions, and wherein said cursor control means shifts the cursor in response to a shift instruction of said shift instructing means; and means for, when the cursor is shifted and displayed at a pattern position which has already been displayed on said display means by said shift instructing means, changing the display form of the cursor and an amount of the cursor shift in correspondence to the character pitch of the character, wherein when the character pitch changes for characters on the same line, the display form of the cursor changes for characters on the same line.

11. An apparatus according to claim 10, further comprising printing means for printing the character pattern displayed on said display means.

12. An apparatus according to claim 10, wherein said shift instructing means comprises means for switching between a mode in which the cursor may be shifted at a predetermined pitch in the upward, downward, left, or right directions and a mode in which the cursor may be shifted at a pitch smaller than the predetermined pitch in the upward, downward, left, or right directions.

13. A character processing apparatus comprising:

input means for inputting character information and an instruction for moving a cursor;

memory means for storing the character information input by said input means;

image memory means for storing a pattern developed from the character information stored in said memory means, wherein said image memory means is adapted to store a pattern developed from character information extending over a plurality of lines;

display memory means for storing the pattern extending over a plurality of lines developed in said image memory means;

display means for displaying the pattern extending over a plurality of lines stored in said display memory means and a cursor to designate a position in each of the plurality of lines at which the pattern is displayed on said display means, said display means displaying different types of characters on the same line determining different cursor forms on the same line, depending on the type of displayed character, wherein said display means comprises memory means for storing patterns corresponding to a plurality of character pitches;

cursor control means for moving the cursor by a character unit upon input of character information, said cursor control means moving the cursor by a different character unit and changing the cursor form to different forms on the same line in response to the different types of input character information displayed on the same line;

memory control means for controlling said memory means to store the character information input by said input means in accordance with the position of the cursor moved by said cursor control means; and printing control means for selecting a type element of a print wheel corresponding to the character information and for hitting the type element to print a desired character on a recording medium.

14. An apparatus according to claim 13, further comprising shift instructing means for instructing the shifting of the cursor on said display means in vertical and horizontal directions.

15. An apparatus according to claim 14, further comprising means for, when the cursor is shifted and displayed to a pattern position which has already been displayed on said display means by said shift instructing means, changing the display form of the cursor in correspondence to a character pitch of the pattern at said position.

16. An apparatus according to claim 14, wherein said shift instructing means comprises means for switching between a mode in which the cursor may be shifted at a predetermined pitch in the upward, downward, left, or right directions and a mode in which the cursor may be shifted at a pitch smaller than the predetermined pitch in the upward, downward, left, or right directions.

* * * * *

UNITED STATES PATENT AND TRADEMARK OFFICE
CERTIFICATE OF CORRECTION

PATENT NO. : 5,737,502

DATED : April 7, 1998

INVENTOR(S) : NAOKI SHIMADA

It is certified that error appears in the above-identified patent and that said Letters Patent is hereby corrected as shown below:

COLUMN 3:

Line 4, "key." should read --key--.

COLUMN 5

Line 47, "Two" should read --two--.

COLUMN 6

Lines 51, "Y'," should read --y',--.

COLUMN 7:

Line 21, "prevent" should read --prevent the--.

COLUMN 8:

Line 20, "201G," should read --21G--.

UNITED STATES PATENT AND TRADEMARK OFFICE
CERTIFICATE OF CORRECTION

PATENT NO. : 5,737,502
DATED : April 7, 1998
INVENTOR(S) : NAOKI SHIMADA

It is certified that error appears in the above-identified patent and that said Letters Patent is hereby corrected as shown below:

COLUMN 9:

Line 14, "A' and B'" should read --A" and B"--.

COLUM 13

Line 64, delete "character".

Signed and Sealed this

Twenty-eighth Day of July, 1998

Attest:

BRUCE LEHMAN

Attesting Officer

Commissioner of Patents and Trademarks